US007521138B2

(12) United States Patent
Pearson

(10) Patent No.: US 7,521,138 B2
(45) Date of Patent: Apr. 21, 2009

(54) APPARATUS AND METHOD FOR HYBRID POWER MODULE SYSTEMS

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 400 days.

(21) Appl. No.: 10/875,622

(22) Filed: Jun. 23, 2004

(65) Prior Publication Data

US 2005/0249988 A1  Nov. 10, 2005

Related U.S. Application Data

(60) Provisional application No. 60/569,218, filed on May 7, 2004.

(51) Int. Cl.
*H01M 8/24* (2006.01)
*H01M 10/44* (2006.01)
*H01M 16/00* (2006.01)

(52) U.S. Cl. .................. 429/9; 429/22; 429/23; 429/32; 320/101

(58) Field of Classification Search .................. None
See application file for complete search history.

(56) References Cited

U.S. PATENT DOCUMENTS

| 3,443,115 | A | 5/1969 | Timmerman, Jr. ............ 307/66 |
| 3,800,208 | A | 3/1974 | Macharg ...................... 320/20 |
| 3,823,358 | A | 7/1974 | Rey .............................. 320/3 |
| 4,000,003 | A | 12/1976 | Baker et al. ................... 429/7 |
| 4,056,764 | A | 11/1977 | Endo et al. ...................... 320/3 |
| 4,721,660 | A | 1/1988 | Kujas ........................... 429/40 |
| 4,839,574 | A | 6/1989 | Takabayashi .................. 320/3 |
| 4,883,724 | A | 11/1989 | Yamamoto .................... 429/23 |
| 4,904,548 | A | 2/1990 | Tajima ......................... 429/22 |
| 4,931,947 | A | 6/1990 | Werth et al. ................. 364/492 |
| 4,962,462 | A | 10/1990 | Fekete ....................... 364/492 |
| 5,154,986 | A | 10/1992 | Takechi et al. ............... 429/23 |
| 5,318,142 | A | 6/1994 | Bates et al. ................ 180/65.2 |

(Continued)

FOREIGN PATENT DOCUMENTS

CA    2284589    9/1998

(Continued)

OTHER PUBLICATIONS

"Large-Can EDLC Capacitors: A Market in the Making," *Passive Component Industry*, pp. 7-8, 10-11, 14, Jul./Aug. 2001.

(Continued)

*Primary Examiner*—Jonathan Crepeau
*Assistant Examiner*—Tony Chuo
(74) *Attorney, Agent, or Firm*—Seed IP Law Group PLLC

(57) ABSTRACT

A hybrid power module suitable for use in an array of hybrid power modules comprises a fuel cell stack, an energy storage device, charger circuit operable to charge the energy storage device from the fuel cell stack and/or an external power source at approximately a defined voltage; a stack disconnect switch operable to provide and remove an electrical path between the fuel cell stack and a terminal of the power module, and a unidirectional current flow device electrically coupled to provide a unidirectional current path from the charger circuit to the terminal of the power module when forward biased.

27 Claims, 12 Drawing Sheets

U.S. PATENT DOCUMENTS

| | | | | |
|---|---|---|---|---|
| 5,334,463 | A | 8/1994 | Tajima et al. | 429/9 |
| 5,339,018 | A | 8/1994 | Brokaw | 320/35 |
| 5,465,011 | A | 11/1995 | Miller et al. | 307/64 |
| 5,482,790 | A | 1/1996 | Yamada et al. | 429/9 |
| 5,550,461 | A * | 8/1996 | Pouzoullic | 323/269 |
| 5,601,936 | A | 2/1997 | Dudfield et al. | 429/13 |
| 5,624,768 | A | 4/1997 | Tanokura | 429/23 |
| 5,714,874 | A | 2/1998 | Bonnefoy | 323/299 |
| 5,780,980 | A | 7/1998 | Naito | 318/139 |
| 5,916,699 | A | 6/1999 | Thomas et al. | 429/3 |
| 5,929,594 | A | 7/1999 | Nonobe et al. | 320/104 |
| 5,998,885 | A | 12/1999 | Tamor et al. | 307/10.1 |
| 6,011,324 | A | 1/2000 | Kohlstruck et al. | 307/64 |
| 6,030,718 | A | 2/2000 | Fuglevand et al. | 429/26 |
| 6,096,448 | A | 8/2000 | Wilkinson et al. | 429/13 |
| 6,096,449 | A | 8/2000 | Fuglevand et al. | 429/13 |
| 6,100,665 | A | 8/2000 | Alderman | 320/127 |
| 6,134,124 | A | 10/2000 | Jungreis et al. | 363/34 |
| 6,158,537 | A | 12/2000 | Nonobe | 180/65.3 |
| 6,184,593 | B1 | 2/2001 | Jungreis | 307/64 |
| 6,187,464 | B1 | 2/2001 | Yasumoto et al. | 429/13 |
| 6,214,484 | B1 | 4/2001 | Hauer | 429/9 |
| 6,215,272 | B1 | 4/2001 | Ohara et al. | 320/104 |
| 6,218,035 | B1 * | 4/2001 | Fuglevand et al. | 429/30 |
| 6,255,008 | B1 | 7/2001 | Iwase | 429/9 |
| 6,312,846 | B1 | 11/2001 | Marsh | 429/30 |
| 6,370,048 | B1 * | 4/2002 | Canter | 363/65 |
| 6,451,470 | B1 | 9/2002 | Koschany et al. | 429/40 |
| 6,465,910 | B2 | 10/2002 | Young et al. | 307/64 |
| 6,472,090 | B1 | 10/2002 | Colbow et al. | 429/13 |
| 6,497,974 | B2 | 12/2002 | Fuglevand | 429/22 |
| 6,503,649 | B1 | 1/2003 | Czajkowski et al. | |
| 6,555,989 | B1 | 4/2003 | Pearson | 320/101 |
| 6,573,682 | B1 | 6/2003 | Pearson | 320/101 |
| 6,677,066 | B1 | 1/2004 | Jansen et al. | 429/7 |
| 6,743,536 | B2 | 6/2004 | Fuglevand | 429/9 |
| 6,757,590 | B2 | 6/2004 | Ross et al. | 700/286 |
| 6,761,987 | B2 | 7/2004 | Marvin et al. | 429/13 |
| 6,773,839 | B2 | 8/2004 | Fuglevand et al. | 429/22 |
| 6,835,481 | B2 | 12/2004 | Dickman et al. | 429/19 |
| 6,847,515 | B1 | 1/2005 | Kelley et al. | 361/160 |
| 6,893,757 | B2 | 5/2005 | Kato | 429/23 |
| 6,896,990 | B2 | 5/2005 | Mattejat et al. | 429/38 |
| 7,132,185 | B2 | 11/2006 | Wardrop et al. | 429/22 |
| 2001/0044040 | A1 | 11/2001 | Uribe et al. | 429/13 |
| 2002/0036430 | A1 | 3/2002 | Welches et al. | 307/18 |
| 2002/0047686 | A1 * | 4/2002 | Kodama et al. | 320/101 |
| 2002/0051898 | A1 | 5/2002 | Moulthrop, Jr. et al. | 429/17 |
| 2002/0095247 | A1 * | 7/2002 | Ding et al. | 701/22 |
| 2002/0177021 | A1 | 11/2002 | Fuglevand | 429/23 |
| 2002/0190698 | A1 * | 12/2002 | Smidt et al. | 323/222 |
| 2003/0022031 | A1 * | 1/2003 | Manery | 429/7 |
| 2003/0022036 | A1 | 1/2003 | Parr | 429/22 |
| 2003/0022037 | A1 | 1/2003 | Parr et al. | 429/22 |
| 2003/0022038 | A1 | 1/2003 | Vaal et al. | 429/22 |
| 2003/0022040 | A1 | 1/2003 | Wells | 429/23 |
| 2003/0022041 | A1 | 1/2003 | Barton et al. | 429/23 |
| 2003/0022042 | A1 | 1/2003 | Wells et al. | 429/23 |
| 2003/0022045 | A1 | 1/2003 | Wells et al. | 429/26 |
| 2003/0022050 | A1 | 1/2003 | Barton et al. | 429/34 |
| 2003/0072977 | A1 | 4/2003 | Speranza et al. | 429/9 |
| 2003/0091882 | A1 * | 5/2003 | Schmidt et al. | 429/23 |
| 2003/0111908 | A1 | 6/2003 | Christensen | 307/43 |
| 2003/0111977 | A1 | 6/2003 | Pearson | 320/101 |
| 2003/0113594 | A1 | 6/2003 | Pearson | 429/9 |
| 2003/0113599 | A1 | 6/2003 | Pearson | 429/23 |
| 2003/0235730 | A1 * | 12/2003 | Noetzel et al. | 429/23 |
| 2004/0009380 | A1 | 1/2004 | Pearson | 429/23 |
| 2004/0126635 | A1 | 7/2004 | Pearson | 429/23 |
| 2004/0164702 | A1 * | 8/2004 | Holmes | 320/101 |
| 2004/0180243 | A1 | 9/2004 | Pearson | 429/13 |
| 2004/0185316 | A1 | 9/2004 | Wells et al. | 429/22 |
| 2004/0229095 | A1 | 11/2004 | Pearson | 429/23 |
| 2005/0110453 | A1 * | 5/2005 | Lecky | 320/101 |
| 2005/0249989 | A1 | 11/2005 | Pearson | 429/13 |
| 2006/0172162 | A1 | 8/2006 | Pearson | 429/22 |

FOREIGN PATENT DOCUMENTS

| | | |
|---|---|---|
| DE | 198 10 468 A1 | 9/1999 |
| DE | 100 10 985 A1 | 9/2001 |
| EP | 0 136 187 A2 | 4/1985 |
| EP | 0 334 474 A2 | 9/1989 |
| EP | 0 961 334 A2 | 12/1999 |
| EP | 1 009 054 A2 | 6/2000 |
| EP | 1 065 775 A2 | 1/2001 |
| GB | 1131171 | 10/1968 |
| GB | 2 281 642 A | 3/1995 |
| JP | 58-133789 | 8/1983 |
| JP | 59-134573 | 8/1984 |
| JP | 1-234024 | 9/1989 |
| JP | 5-47396 | 2/1993 |
| JP | 6-29029 | 2/1994 |
| JP | 6-314569 | 11/1994 |
| JP | 7-105965 | 4/1995 |
| JP | 8-50902 | 2/1996 |
| JP | 8-213032 | 8/1996 |
| JP | 11-191424 | 7/1999 |
| WO | WO 01/71885 A1 | 9/2001 |
| WO | WO 01/73879 A1 | 10/2001 |
| WO | WO 02/084670 A1 | 10/2002 |
| WO | WO 02/095851 A1 | 11/2002 |

OTHER PUBLICATIONS

Maloney, T., Power Computing Solutions, "PEM-Battery: Design, Construction, and Test," in *Proceedings of the 1999 Joint Fuel Cell Technology Review Conference*, retrieved from http://www.netl.doe.gov/publications/proceedings/99/99fuelcell/fc3-8.pdf.

Warner, S., "Extending the Reliability of DC Power in a Telecommunications Network," in *Proceedings of the 15th International Telecommunications Energy Conference*, 1993, vol. 1, pp. 83-86.

Nickerson, J., "Ultracapacitors: Managing Power and Energy," retrieved 2004 from http://www.darnell.com/powerpulse/archive/aa_061200b1.stm.

Ertl, H., et al., "A Novel Multi-Cell DC-AC Converter for Applications in Renewable Energy Systems," in *Proceedings of the 43rd International Conference on Power Conversion*, 2001, pp. 579-586.

Kato, N., et al., "A 1 kW Portable Fuel Cell System Based on Polymer Electrolyte Fuel Cells" *NTT R&d 48*(12):877-881, 1999.

U.S. Appl. No. 10/430,903, filed May 6, 2003, Pearson.

U.S. Appl. No. 10/440,512, filed May 16, 2003, Pearson.

U.S. Appl. No. 60/569,218, filed May 7, 2004, Pearson.

Key, T., "Fast Response, Load-Matching Hybrid Fuel Cell", *EPRI PEAC Quarterly Review Meeting*, Washington, DC, Jul. 27, 2001, retrieved from http://www.eere.energy.gov/distributedpower/pdfs/review3q01pres/epripeacfc1001.pdf.

Garber, S., NASA History Web Curator, "Apollo 13 Review Board (Cortright Commission)," Updated Oct. 1, 2002, Sivram Prasad, NASA History Office, retrieved from http://history.nasa.gov/ap13rb/ap13index.htm.

Bernay, C., et al., "Prospects of Different Fuel Cell Technologies for Vehicle Applications," *Journal of Power Sources 108*:139-152, 2002.

Boyer, C., et al., "Evaluation of Methods to Increase the Oxygen Partial Pressure in PEM Fuel Cells," *Journal of Applied Electrochemistry 29*:1095-1102, 1999.

EPRIsolutions, Inc., "Market Assessment of Ultracapacitors for Medium and High Power Applications," Palo Alto, CA, 2000, 1000810.

Mai, W., "Dual Current-Limiting Switch for USB Applications," *Electronic Design*, pp. 124, 126, May 2000.

Marr, C., et al., "Composition and Performance Modelling of Catalyst Layer in a Proton Exchange Membrane Fuel Cell," *Journal of Power Sources 77*:17-27, 1999.

Murthy, M., et al., "The Performance of a PEM Fuel Cell Exposed to Transient CO Concentrations," *Electrochemical and Solid State Letters*, Oct. 2001, retrieved Oct. 13, 2004, from http://www.gore.com/fuelcells/pdfs/1.pdf>, pp. 1-22.

Power Distribution Inc., "PDI Switcher Solutions: CBEMA Curve Reissued," Richmond, VA, 1998.

Rufer, A. et al., "A Supercapacitor-Based Energy Storage System for Elevators with Soft Commutated Interface," in *Proceedings of the Energy Storage Association, Spring Meeting 2001*, Chattanooga, TN, Mar. 2001, retrieved from http://leiwww.epfl.ch/publications/rufer_barrade_ias_01.pdf.

Schneuwly, A. et al., "BOOSTCAP® Double-Layer Capacitors for Peak Power Automotive Applications," in *Proceedings of the Energy Storage Association, Spring Meeting 2001*, Chattanooga, TN, Mar. 2001, retreived from http://ecl.web.psi.ch/Publications/cap_pub/AABC_2002.pdf.

U.S. Appl. No. 11/558,383, filed Nov. 9, 2006, Pearson.

U.S. Appl. No. 60/421,126, filed May 16, 2002, Pearson.

U.S. Appl. No. 60/436,759, filed Dec. 27, 2002, Pearson.

Texas Instruments Incorporated, "'Hot Plug-In' In-Rush Current Limiting Circuits for Power Trends' DC-DC Converters," Dallas, TX, 2000.

* cited by examiner

APPARATUS AND METHOD FOR HYBRID POWER MODULE SYSTEMS

BACKGROUND OF THE INVENTION

1. Field of the Invention

This disclosure generally relates to electrical power systems, and more particularly to electrical power systems comprising one or more hybrid power modules, the hybrid power modules comprising, for example, a fuel cell stack and energy storage device.

2. Description of the Related Art

Electrochemical fuel cells convert fuel and oxidant to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane electrode interface to induce the desired electrochemical reaction. In operation, the electrodes are electrically coupled for conducting electrons between the electrodes through an external circuit. Typically, a number of MEAs are electrically coupled in series to form a fuel cell stack having a desired power output.

In typical fuel cells, the MEA is disposed between two electrically conductive fluid flow field plates or separator plates. Fluid flow field plates have flow passages to direct fuel and oxidant to the electrodes, namely the anode and the cathode, respectively. The fluid flow field plates act as current collectors, provide support for the electrodes, provide access channels for the fuel and oxidant, and provide channels for the removal of reaction products, such as water formed during fuel cell operation. The fuel cell system may use the reaction products in maintaining the reaction. For example, reaction water may be used for hydrating the ion exchange membrane and/or maintaining the temperature of the fuel cell stack.

In most practical applications, it is desirable to maintain an approximately constant voltage output from the fuel cell stack. One approach is to employ an energy storage device such as a battery or ultra-capacitor electrically coupled in parallel with the fuel cell system as a hybrid power module, to provide additional current when the demand of the load exceeds the output of the fuel cell stack and to store current when the output of the fuel cell stack exceeds the demand of the load, as taught in commonly assigned pending U.S. patent application Ser. No. 10/017,470, entitled "Method and Apparatus for Controlling Voltage From a Fuel Cell System"; Ser. No. 10/017,462, entitled "Method and Apparatus for Multiple Mode Control of Voltage From a Fuel Cell System"; and Ser. No. 10/017,461, entitled "Fuel Cell System Multiple Stage Voltage Control Method and Apparatus", all filed Dec. 14, 2001. Thus, the energy storage device provides the ability to accommodate starting, bridging and surging power requirements. While the energy storage device could be charged while the fuel cell stack produces power, charging from an external source when the fuel cell stack is not operating has required an external equalizer.

As taught in commonly assigned pending patent applications, it is also desirable to provide redundancy for arrays of hybrid power modules, electrically coupled in series and/or parallel. Providing redundancy is complicated by the possibility of a shorted cell of an energy storage device dragging down other energy storage devices electrically coupled in parallel with the malfunctioning energy storage device. It is also desirable to allow the use of different types of energy storage devices in an array of hybrid power modules, for example, different energy storage devices (e.g., batteries and ultra-capacitors), different battery chemistries (e.g., lead acid, nickel metal hydride, nickel cadmium, lithium ion), energy storage devices of different ages, and/or energy storage devices produced by different manufacturers. It is further desirable to allow exchanges ("hot swappable") of working hybrid power modules and/or energy storage devices for malfunctioning hybrid power modules and/or energy storage devices without having to power down the array.

The many different practical applications for fuel cell based power supplies require a large variety of different power delivery capabilities. In most instances it is prohibitively costly and operationally inefficient to employ a power supply capable of providing more power than required by the application. It is also costly and inefficient to design, manufacture and maintain inventories of different power supplies capable of meeting the demand of each potential application (e.g., 1 kW, 2 kW, 5 kW, 10 kW, etc.). Further, it is desirable to increase the reliability of the power supply, without significantly increasing the cost. It is also costly and inefficient to design, manufacture and maintain different external equalizers to accommodate the various customer requirements.

Thus, a less costly, less complex and/or more efficient approach to fuel cell based power supplies, such as hybrid power modules is desirable.

BRIEF SUMMARY OF THE INVENTION

In one aspect, a hybrid power module comprises a module power bus comprising at least a first bus terminal and a second bus terminal; a plurality of fuel cells electrically coupled to one another as a fuel cell stack, the fuel cell stack comprising a first pole and a second pole, the fuel cell stack selectively operable to produce electrical power, and electrically couplable to provide the electrical power on the module power bus; an energy storage device comprising a first pole and a second pole; and the energy storage device operable to store and release electrical power; a first linear regulator electrically coupled between the first pole of the fuel cell stack and the first bus terminal of the module power bus, and operable to regulate a flow of current from the fuel cell stack to the first bus terminal; at least two input terminals; and a charger circuit electrically coupled across the battery and operable to supply electrical power to the energy storage device at approximately a defined voltage and charging regime, the charger circuit comprising a second linear regulator electrically coupled between the first pole of the energy storage device and a node electrically located between the first pole of the fuel cell stack and at least one of the at least two input terminals, the second linear regulator operable to regulate a flow of current to the energy storage device from the fuel cell stack and from the input terminals via the node according to the charging regime.

In another aspect, a method of operating a hybrid power module comprises, in a first mode, receiving power from an external power source at a charger circuit of the hybrid power module, and regulating a current flow from the external power source to an energy storage device of the hybrid power module with the charger circuit according to a defined charging regime; in a second mode, producing power from a fuel cell stack of the hybrid power module; supplying power produced by the fuel cell stack to bus terminals of the module power bus; from time-to-time in the second mode, supplying power from the fuel cell stack to the charger circuit; and regulating a current flow from the fuel cell stack to the energy storage device with the charger circuit according to the defined charging regime.

In yet another aspect, a hybrid power module comprises a fuel cell stack operable to produce electrical power; a module power bus comprising at least two bus terminals, the module power bus coupled to supply electrical power from the fuel cell stack to the bus terminals; means for regulating a current flow from the fuel cell stack to at least one of the bus terminals; energy storage means for storing electrical energy; at least two input terminals electrically couplable to receive power from an external power source that is distinct from the hybrid power module; and charger circuit means for regulating a current flow to the energy storage means from the fuel cell stack and from the external power source, according to the defined charging regime.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with fuel cell systems, fuel cells, compressors, fans, reactant supplies, energy storage devices, and charger circuits have not been shown or described in detail to avoid unnecessarily obscuring descriptions of the embodiments.

Unless the context requires otherwise, throughout the specification and claims which follow, the word "comprise" and variations thereof, such as, "cormprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
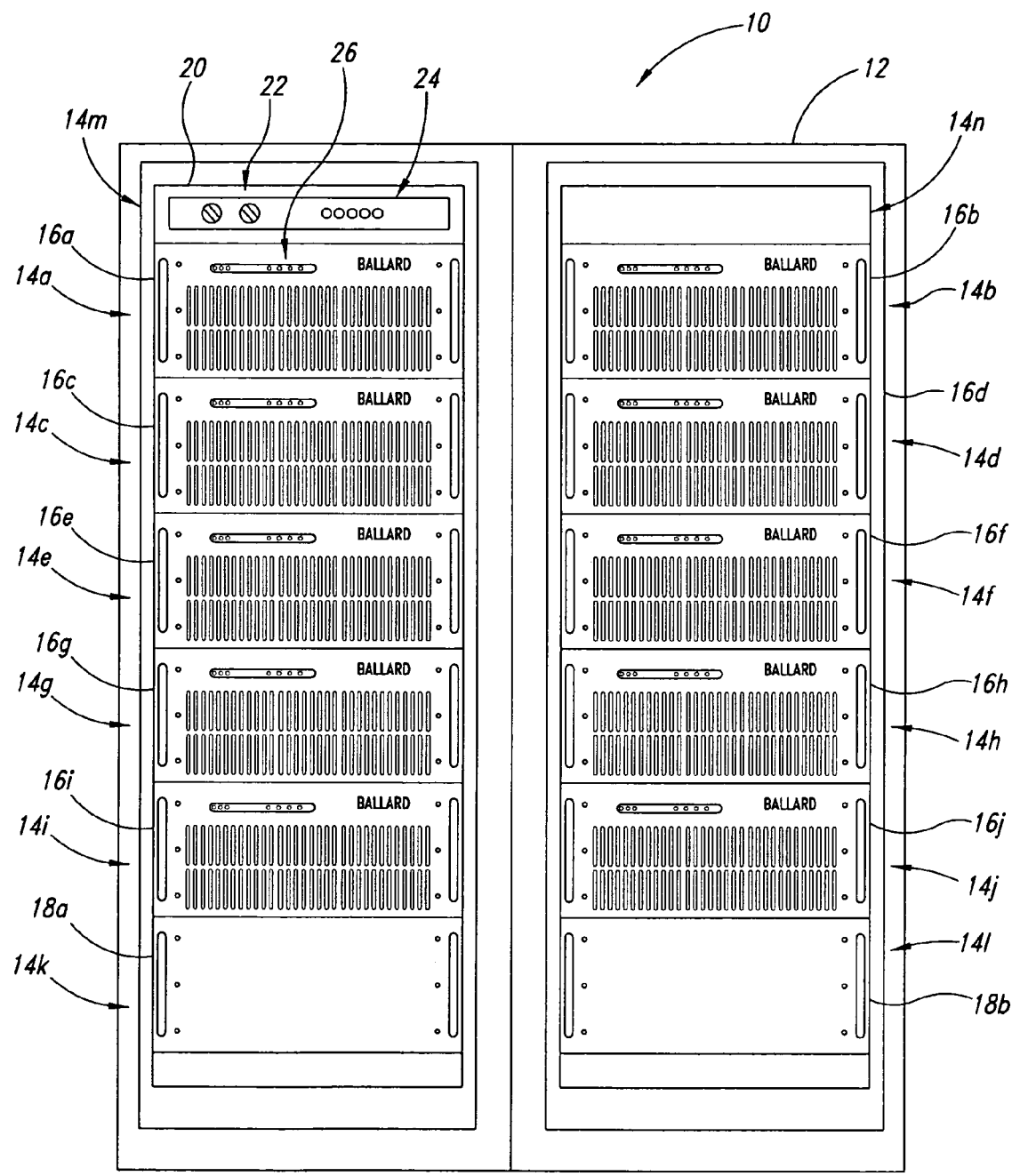
FIG. 1 is a front elevational view of a power system comprising a housing including a number of positions to mount one or more hybrid power modules, reservoirs to collect byproduct of the electrical generation process and system controller or other modules or equipment, according to one illustrated embodiment.

FIG. 1 shows a power system 10, according to one illustrated embodiment.

The power system 10 comprises a housing 12. The housing 12 includes a number of positions 14a-14l, each of the positions 14a-14l sized and dimensioned to mount a respective one of a plurality of hybrid power modules 16a-16j. The hybrid power modules 16a-16j are discussed more fully below, with reference to FIG. 3. The housing 12 may take the form of a rack that allows various components such as the hybrid power modules 16a-16j to be easily installed, removed and/or replaced. While FIG. 1 shows ten positions 14a-14j and ten hybrid power modules 16a-16j, the housing 12 may comprise a greater or lesser number of positions, and/or a greater or lesser number of hybrid power modules.

The housing 12 may also comprise one or more positions 14k, 14l, the positions 14k, 14i sized and dimensioned to mount one or more reservoirs 18a, 18b. The reservoirs 18a, 18b may collect the byproducts of the power generation process. For example, the reservoirs 18a, 18b may collect water resulting from the operation of fuel cells to produce electric power. The collection of byproduct is discussed more fully below, with reference to FIG. 2. While illustrated as having substantially the same dimensions as the hybrid power modules 16a-16j, the reservoirs 18a, 18b and the respective positions 14k, 14l may have different dimensions from that of the hybrid power modules 16a-16j.

The reservoirs 18a, 18b may take the form of drawers, that may be slid in and out of the housing 12 for easily emptying the byproduct, and/or may include spouts, faucets, valves or other structures for easily draining the reservoirs 18a, 18b.

The reservoirs 18a, 18b may be sized to collect the amount of byproduct expected to be produced by a given amount of reactant, for example, hydrogen or hydrogen-containing gas. Thus, the reservoirs 18a, 18b may be emptied at the same time that the reactant is replenished, for example, via a service call by a service person. This may be particularly advantageous for installations where access to drainage or sewage systems is not readily available. Thus, the described power system 10 is particularly suitable for use in remote locations, typical of many telecommunication switching points or relay stations.

Additionally, or alternatively, the power system 10 may include one or more recycling systems (not shown) for reusing the byproduct collected in the reservoirs 18a, 18b, for example, for hydrating membranes of fuel cells.

The housing 12 may also include additional positions 14m, 14n, the positions 14m, 14n sized and dimensioned to mount a system controller 20 or other modules or equipment. The system controller 20 can be electrically and/or communicatively coupled to control operation of the power system 10, and/or individual power modules 16a-16j. The system controller 20 may include user operable controls 22 and/or indicators 24. These user operable controls 20 and indicators 22 may be in addition, or as a substitute for controls (not shown in FIG. 1) and indicators 24 (only one called out in FIG. 1) of the hybrid power modules 16a-16j.

Figure 2:
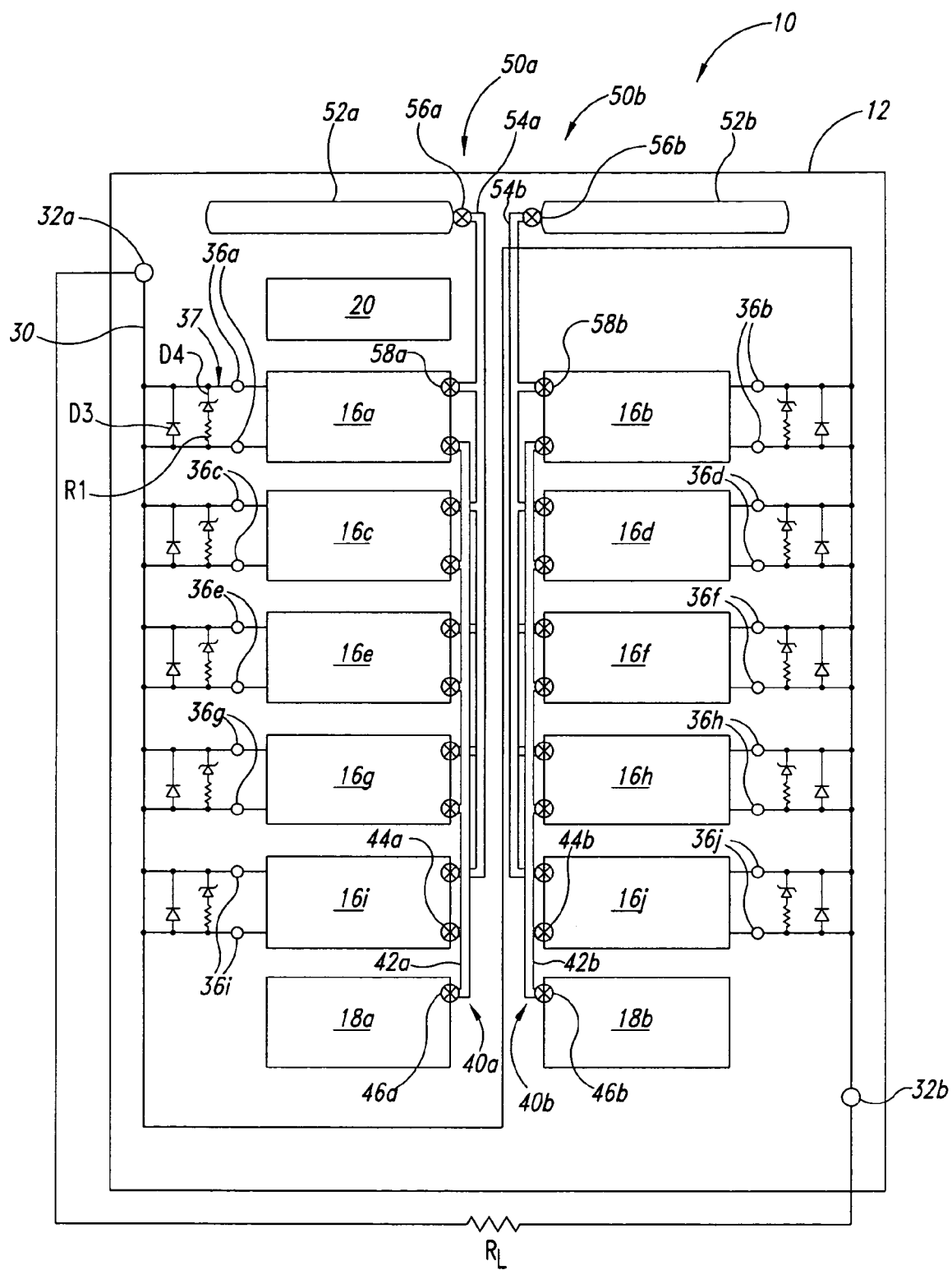
FIG. 2 is a schematic diagram of the power system of FIG. 1, illustrating a system power bus, a reactant supply system and a byproduct transport system for removing byproduct resulting from the electrical power generation process, according to one illustrated embodiment.

FIG. 2 shows an internal configuration of the power system 10 according to one illustrated embodiment.

The power system 10 includes a system power bus 30, comprising at least one electrical current path, and first and second terminals 30a, 30b, respectively. The first and second terminals 30a, 30b allow electrical couplings to be made to an external load, represented diagrammatically by resistance RL.

The system power bus 30 also comprises a number of pairs of selectively releasable connectors 36a-36j to selectively make electrical couplings respective ones of the hybrid power modules 16a-16j when the hybrid power modules 16a-16j are mounted respective ones of the positions 14a-14j.

The system power bus 30 may also comprise a module bypass diode $D_3$ to bypass current around the particular hybrid power module 16a-16j when the hybrid power module 16a-16j is not producing power. Note, for clarity of illustration, only one instance of the module bypass diode D3 is explicitly called out in FIG. 2. The module bypass diode D3 prevents power module voltage reversal from occurring where the hybrid power module 16a-16j is unable to maintain the demanded current level.

The system power bus 30 may also comprise a module charging bias circuit 37. The module charging bias circuit 37 bypasses current around a module which is not consuming sufficient power when the system power bus 30 is being supplied from a source other than the modules. The module charging bias circuit 37 also prevents module voltage from rising to an unacceptably high level should any of the other hybrid power modules 16a-16j in the series string require a higher charging current. The module charging bias circuit may take the form of a Zener diode D4 electrically coupled in series with a resistor R1, and may include additional elements. Note, for clarity of illustration, only one instance each of the Zener diode D4 and the resistor R1 are explicitly called out in FIG. 2. Alternatively, the module charging bias circuit 37 may employ transistors to produce the Zener action.

FIG. 2 also shows a byproduct transport system 40a, 40b which may take the form of conduit 42a, 42b fluidly coupling each of the hybrid power modules 16a-16j to the reservoirs 18a, 18b. The byproduct transport system 40a, 40b may include valves and/or other suitable fluid coupling structures 44a, 44b proximate each of positions 14a, 14j to make fluid connections with a respective one of the power module 16a-16j received at the positions 14a-14j. Note, only two of the valves and/or other fluid coupling structures 44a, 44b are explicitly called out in FIG. 2. The values and/or other suitable fluid coupling structures 44a, 44b are operable, for example, via electrical, mechanical and/or electromechanical actuators, to control fluid flow from the hybrid power modules 16a-16j to the conduit 42a, 42b. This permits hybrid modules 16a-16j to be easily removed from the housing 10, for example for servicing, without causing spills.

The byproduct transport system 40a, 40b may also include valves and/or other coupling structures 46a, 46b for fluidly connecting the conduit 42a, 42b to the reservoirs 18a, 18b. Note, only two of the valves and/or coupling structures 46a, 46b are explicitly called out in FIG. 2. The valves and/or other suitable fluid coupling structures 46a, 46b are operable, for example via electrical, mechanical and/or electromechanical actuators, to control fluid flow from the conduit 42a, 42b to the reservoirs 18a, 18b. This permits reservoirs 18a, 18b to be easily removed from the housing 10, for example for servicing, without causing spills.

The power system 10 may further include a reactant supply system 50a, 50b, which may comprise reactant supplies 52a, 52b for storing a reactant, such as hydrogen or hydrogen-containing fuel. The reactant supplies 52a, 52b may take the form of tanks, that may be interchangeable with replacement tanks. Alternatively, or additionally, the reactant supplies 52a, 52b may take the form of reformer of other source of reactant. The reactant supply system 50a, 50b may also comprise conduit 54a, 54b, fluidly coupling the reactant supplies 52a, 52b to the hybrid power modules 16a-16j.

The reactant supply system 50a, 50b may further comprise valves and/or other fluid coupling structures 56a, 56b for coupling the conduit 54a, 54b with the reactant supplies 52a, 52b. Note, only two of the valves and/or coupling structures 56a, 56b are explicitly called out in FIG. 2. The valves and/or other fluid coupling structures 56a, 56b are operable, for example via electrical, mechanical and/or electromechanical actuators, to control fluid flow from the reactant supplies 52a, 52b to the conduit 54a, 54b. This permits the reactant supplies 52a, 52b to be changed.

The reactant supply system 50a, 50b may further comprise valves and/or other fluid coupling structures 58a, 58b for coupling respective ones of the hybrid power modules 16a-16j to the conduit 54a, 54b. Note, only two of the valves and/or other fluid coupling structures 58a, 58b are explicitly called out in FIG. 2. The valves and/or other fluid coupling structures 58a, 58b are operable, for example via electrical, mechanical and/or electromechanical actuators, to control fluid flow from the conduit 54a, 54b to respective ones of the hybrid power modules 16a-16j. This permits the hybrid power modules 16a-16j to be removed without venting of reactant to the ambient environment.

Figure 3:
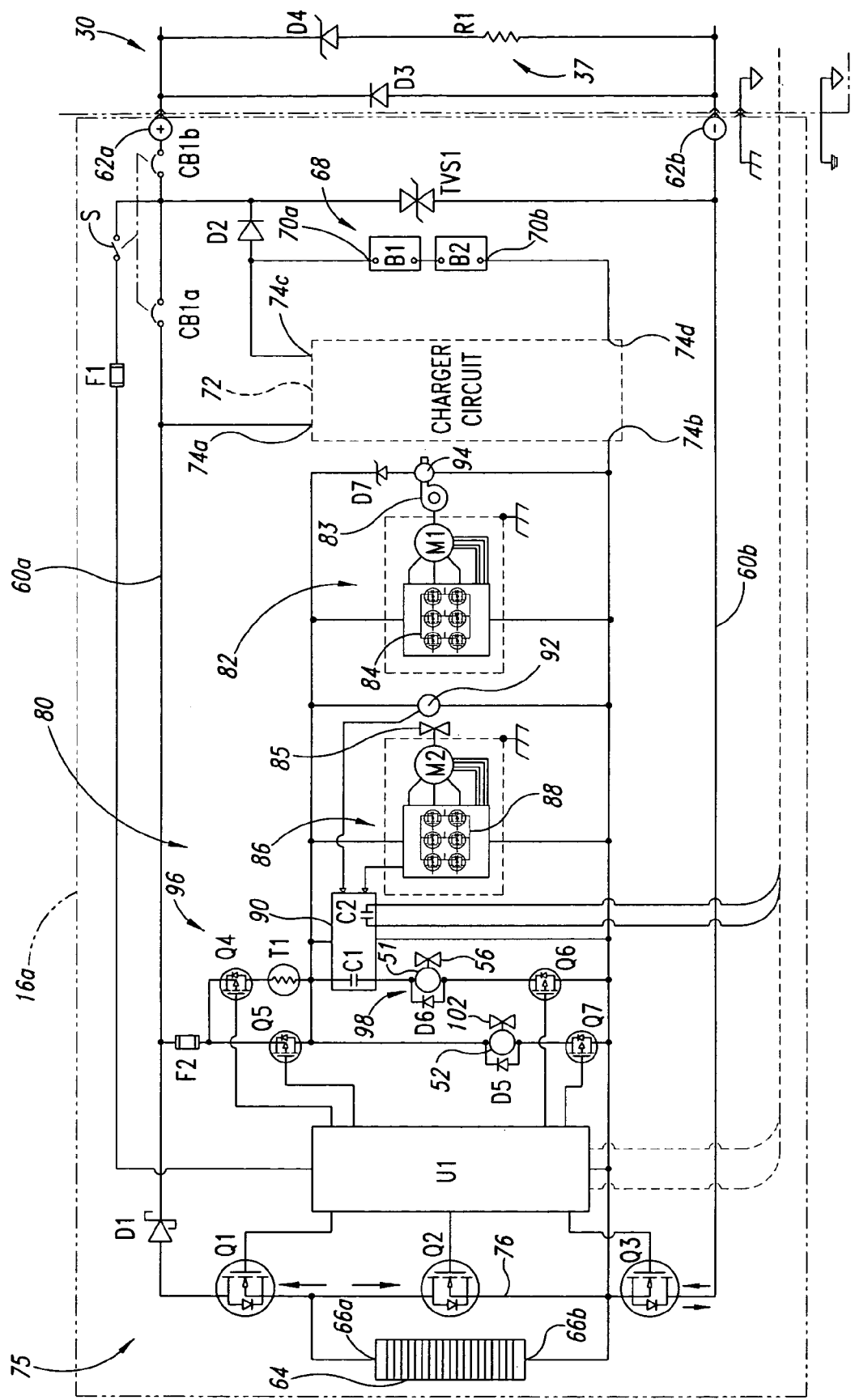
FIG. 3 is a schematic diagram of a hybrid power module and a portion of the system power bus of the housing, according to one illustrated embodiment, where the hybrid power module comprises a fuel cell stack, energy storage device, charger circuit, controller, balance of plant and various switches.

FIG. 3 shows one of the power modules 16a, and a portion of the system power bus 30 according to one illustrated embodiment.

The power module 16a comprises a module power bus formed by first and second current paths 60a, 60b, each of the current paths 60a, 60b terminating in a terminal 62a, 62b, respectively. The terminals 62a, 62b may take the form of electrical connectors adapted to couple to the selectively releasable connectors 36a-36j (FIG. 2) of the system power bus 30, for selectively coupling the hybrid power module 16a to the system power bus 30. A silicon avalanche diode TVS1 is electrically coupled across the current paths 60a, 60b of the module power bus to provide protection to the hybrid power module 16.

The current path 60a includes first and second switches, for example circuit breakers CB1a, CB2b, coupled to operate in tandem. The circuit breakers CB1a, CB1b are selectively operable to electrically disconnect the power module 16a from the system power bus 30 of the power system 10 while the hybrid power module 16a remains mounted in the housing 12 and electrically coupled to the selectively releasable connectors 36a-36b by the terminals 62a, 62b.

The hybrid power module 16a comprises a plurality of fuel cells electrically coupled as a fuel cell stack 64 including a first pole 66a and a second pole 66b. The hybrid power module 16a also comprises a number of energy storage cells B1, B2 electrically coupled as an energy storage device 68 including a first pole 70a and a second pole 70b. The energy storage device 68 may take the form of a battery. Alternatively, in some embodiments the energy storage device 68 may take the form of one or more ultra-capacitors.

The hybrid power module 16a further comprises a charger circuit 72, electrically coupled in parallel with the fuel cell stack 64 and the energy storage device 68. In particular, the charger circuit 72 has a first pole 74a electrically coupled to the first current path 60a and a second pole 74b electrically coupled to the second pole 66b of the fuel cell stack 64. A third and fourth pole 74c, 74d of the charger circuit 72 are electrically coupled to the first and second poles 70a, 70b of the energy storage device 68. In at least one embodiment, the charger circuit 72 may raise the voltage to the desired float voltage of the energy storage device 68, to accommodate the voltage drops across the stack disconnect switch Q3 and/or parallel redundancy diode D2. The charger circuit 72 may be formed as an integral unit, allowing easy replacement, or substitution to accommodate new types of power storage devices 68 with a new or different charging algorithm. Matching the float charge or charging algorithm of the energy storage device 68 can significantly increase life of the energy storage device 68. For example, a 5% error in float charge may produce a 50% reduction in battery life.

A parallel redundancy diode D2 blocks current from entering the energy storage device 68 from any source other than the charger circuit 72. The parallel redundancy diode D2 may additionally, or alternatively, permit the use in parallel of batteries of dissimilar age, dissimilar manufacturer, and/or dissimilar charge levels. The parallel redundancy diode D2 may also permit the use of ultra-capacitors in place of battery cells.

The second pole 66b of the fuel cell stack 64 is electrically coupled to the second current path 60b via a stack disconnect switch Q3. In an ON or CLOSED state, the stack disconnect switch Q3 provides a bidirectional current path between the second pole 66b of the fuel cell stack 64 and the terminal 62b of the module power bus. In an OFF or OPEN state, the stack disconnect switch Q3 provides a unidirectional current path from the second terminal 62b to the second pole 74b of the charger circuit 72 via a body diode of the stack disconnect switch Q3. Thus, the stack disconnect switch Q3 may be operated to provide power to the system power bus 30 and charger circuit 72, or alternatively to disconnect the fuel cell stack 64 from the system power bus 30 while providing a current return flow path from the system power bus 30 to the charger circuit 72.

The hybrid power module 16a may further include a linear regulator 75 for regulating current flow from the fuel cell stack 64 by matching the voltage across the fuel cell stack 64 to the voltage across the module output bus formed by current paths 60a, 60b. The linear regulator 75 may, for example, comprise one or more main transistors Q1 and one or more unidirectional circuit elements, such as Schottky diodes D1 electrically coupled in series with respective ones of the main transistors Q1, along the current path 60a. The Schottky diode D1 protects the fuel cell stack 64 from reverse currents generated by the charger circuit 72, energy storage device 68 and/or system power bus 30.

The hybrid power module 16a may optionally comprise a stack pulsing switch Q2 electrically coupled across the fuel cell stack 64 and operable to selectively create a short circuit path 76 across the fuel cell stack 64 to eliminate non-operating power loss (NOPL). Such operation is discussed in more detail in commonly assigned U.S. patent application Ser. No. 10/430,903, entitled METHOD AND APPARATUS FOR IMPROVING THE PERFORMANCE OF A FUEL CELL ELECTRIC POWER SYSTEM, filed May 6, 2003. The power storage device 68 may carry the load during such pulsing or shorting operation. Additionally, or alternatively, the stack pulsing switch Q2 may be used to boost the power output of the hybrid power module 16a, for example from 1.0 KW to 1.5 kW. The pulsing switch Q2 may be thermally coupled to a main heat sink (not shown), permitting the pulsing switch Q2 to be operated in a linear mode as an "on board" load bank, permitting fuel cell operations such as air starving the fuel cell stack 64.

The power module 16a further comprises a controller U1 communicatively coupled to receive signals from various sensors, and/or to control the states of various switches (e.g., Q1-Q7), motors, valves, compressors, fans, and other actuators. For example, the controller U1 may be electrically coupled to the circuit breakers CB1a, CB1b, via a switch S and fuse F1 to receive a signal when the circuit breakers CB1a, CB1b are open, indicating that the power module 16a is offline. The sensors and actuators, as well as other elements, are commonly referred to as the balance of plant (BOP) 80 and constitute the various systems, subsystems and other elements associated with a fuel cell system. The controller U1 may take a variety of forms such as microprocessors, microcontrollers, application-specific integrated circuits (ASIC), and/or digital signal processors (DSP), with or without associated memory structures such as read only memory (ROM) and/or random access memory (RAM).

The balance of plant 80 may include a pump subsystem 82 for providing air or oxygen to the fuel cell stack 64. The pump subsystem 82 may comprise a motor M1 mechanically coupled to drive an air pump such as a compressor or fan 83. The pump subsystem 82 may also comprise an inverter 84, electrically coupled to convert DC power to AC power for driving the motor M1. The inverter 84 may take the form of a switch mode inverter, for example, comprising three pairs of switches (e.g., insulated gate bipolar junction transistors or metal oxide semiconductor transistors), each pair electrically coupled and operated to provide one phase of three phase AC power.

The balance of plant 80 may also include a cooling subsystem 86. The cooling subsystem 86 may supply air or other coolant to various heat dissipating elements of the hybrid power module 16a, as well as, supplying air or other coolant to the reactant supplies 52a, 52b (FIG. 2). The cooling subsystem 86 may comprise a motor M2 mechanically coupled to drive a compressor or fan 85. The cooling subsystem 86 may also comprise an inverter 88, electrically coupled to convert DC power to AC power for driving the motor M2. the inverter 88 may take the form of a switch mode inverter electrically coupled to convert DC power to AC power for driving the motor M2.

The balance of plant 80 may also include hardwired logic 90 to determine whether suitable or unsuitable conditions exist for supplying reactant to the fuel cell stack 64. For example, a first sensor 92 may detect concentrations of hydrogen, and provide suitable signals to the hardwired logic 90. The first sensor 92 may take the form of a hydrogen sensor (e.g., Hector 3 of FIS sensor available from Advanced Sensor Products of Markham, Ontario, Canada), or conversely an oxygen sensor that permits the concentration of hydrogen to be determined from the relative concentration of oxygen, as discussed in U.S. patent application Ser. No. 09/916,241, entitled "Fuel Cell Ambient Environment Monitoring and Control Apparatus and Method"; and Ser. No. 09/916,212, entitled "Fuel Cell System Having a Hydrogen Sensor." The hardwired logic 90 prevents the valves 56a, 56b and/or 58a, 58b (FIG. 2) of the reactant supply system 50a, 50b from opening if the concentration of hydrogen is too high.

A second sensor 94 may detect a volume of air flow supplied to the fuel cell stack 64 by the pump subsystem 82. For example, the second sensor 94 may take the form of a tachometer to determine the speed of a shaft of the motor M1 or compressor of fan 83. Additionally, or alternatively, the second sensor 94 may take the form of a current sensor coupled to detect the current that the inverter 84 supplies to the motor M1.

A pre-charge circuit 96 is formed by a switch Q4 and a thermistor T1 electrically coupled to the current path 60a via a fuse F2. The switch Q4 is controlled by the controller U1. The pre-charge circuit 96 limits the in-rush current to the pump subsystem 82 and/or cooling subsystem 86 of the balance of plant 80. The pre-charge circuit 96 may be used to per-charge any electrolytic capacitors in the variable speed drives of the pump subsystem 82 and/or cooling subsystem 86. A switch Q5 provides a bypass to the pre-charge circuit 96, and is operable to provide running power to the pump subsystem 82 and/or cooling subsystem 86 or the balance of plant 80. The switch Q5 is controlled via the controller U1.

A supply valve subsystem 98 is operable to operable to OPEN and CLOSE the reactant valves (referred to collective as 56). In addition to the reactant valves 56, the supply value subsystem 98 comprises a solenoid S1, a diode D6, and a switch such as transistor Q6 controlled via the controller U1.

A purge subsystem 100 is operable to OPEN and CLOSE a purge valve 102 that purges the fuel cell stack 64 from time-to-time, and/or for resuscitating the fuel cell stack 64 when needed. Purging and use of the purge valve 102 is discussed in more detail in commonly assigned U.S. patent application Ser. No. 09/916,211, entitled "Fuel Cell Purging Method and Apparatus"; and Ser. No. 09/916,213, entitled "Fuel Cell Resuscitation Method and Apparatus". In addition to the purge valve 102, the purge subsystem 100 comprises a solenoid S2, a diode D5, and a switch such as transistor Q7. The transistor Q7 is controlled via the controller U1.

Figure 4:
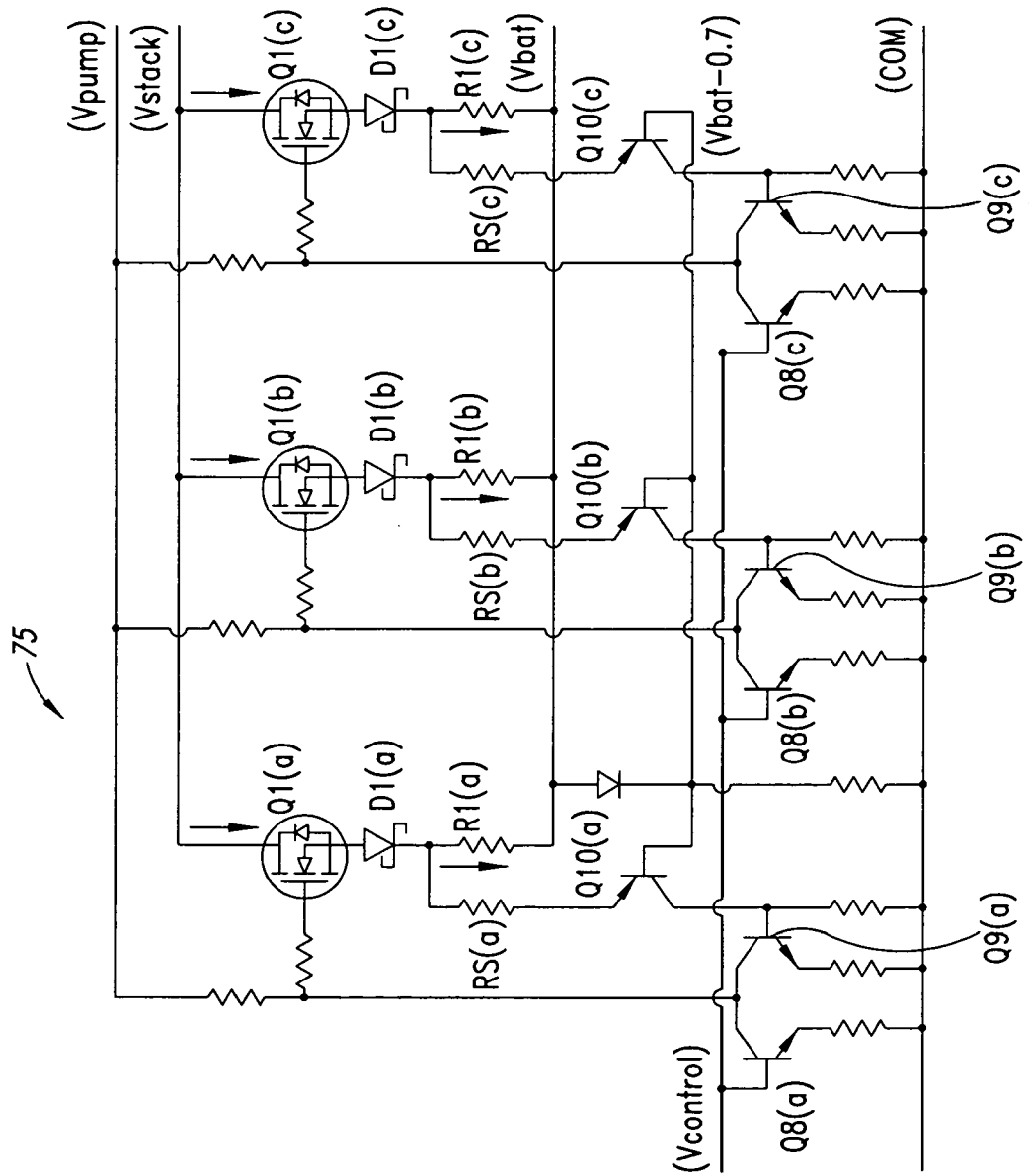
FIG. 4 is a schematic diagram of a linear regulator and stack protection protective diode of the hybrid power module of FIG. 3, according to one illustrated embodiment.

FIG. 4 shows the linear regulator circuit 75 according to one illustrated embodiment, employing three parallel paths for linearly regulating current flow from the fuel cell stack 64. In particular, the linear regulator circuit 75 employs multiple main transistors (three are illustrated) Q1(a)-Q1(c) and multiple Zener diodes (three are illustrated) D1(a)-D1(c). Each of the main transistors Q1(a)-Q1(c) is controlled via a signal applied to the gate/base of the main transistor Q1(a)-Q1(c).

The signal is provided via a controller transistor Q8(a)-Q8(c) and an active current sharing transistor Q9(a)-Q9(c), the pair of transistors Q8(a)-Q8(c), Q9(a)-Q9(c) having commonly coupled drains/collectors. The control transistor Q8(a)-Q8(c) is coupled to receive a control signal Vcontrol from the controller U1. As the control signal Vcontrol increases, the main transistors Q1(a)-Q1(c) turn OFF. The active current sharing transistor Q9(a)-Q9(c) is coupled to receive a control signal from the respective one of the main transistors Q1(a)-Q1(c), via a voltage divider R1(a)-R1(c), RS(a)-RS(c) and a respective amplifying transistor Q10(a)-Q10(c). The active current sharing transistors Q9(a)-Q9(c) assist in equalizing the heat dissipation between the main transistors Q1(a)-Q1(c). The amplifier transistors Q10(a)-Q10(c) amplify the signal from the shunt resistor RS(a)-RS(c), allowing the use of smaller resistances, and thereby providing for active ballasting without incurring significant losses.

Figure 5:
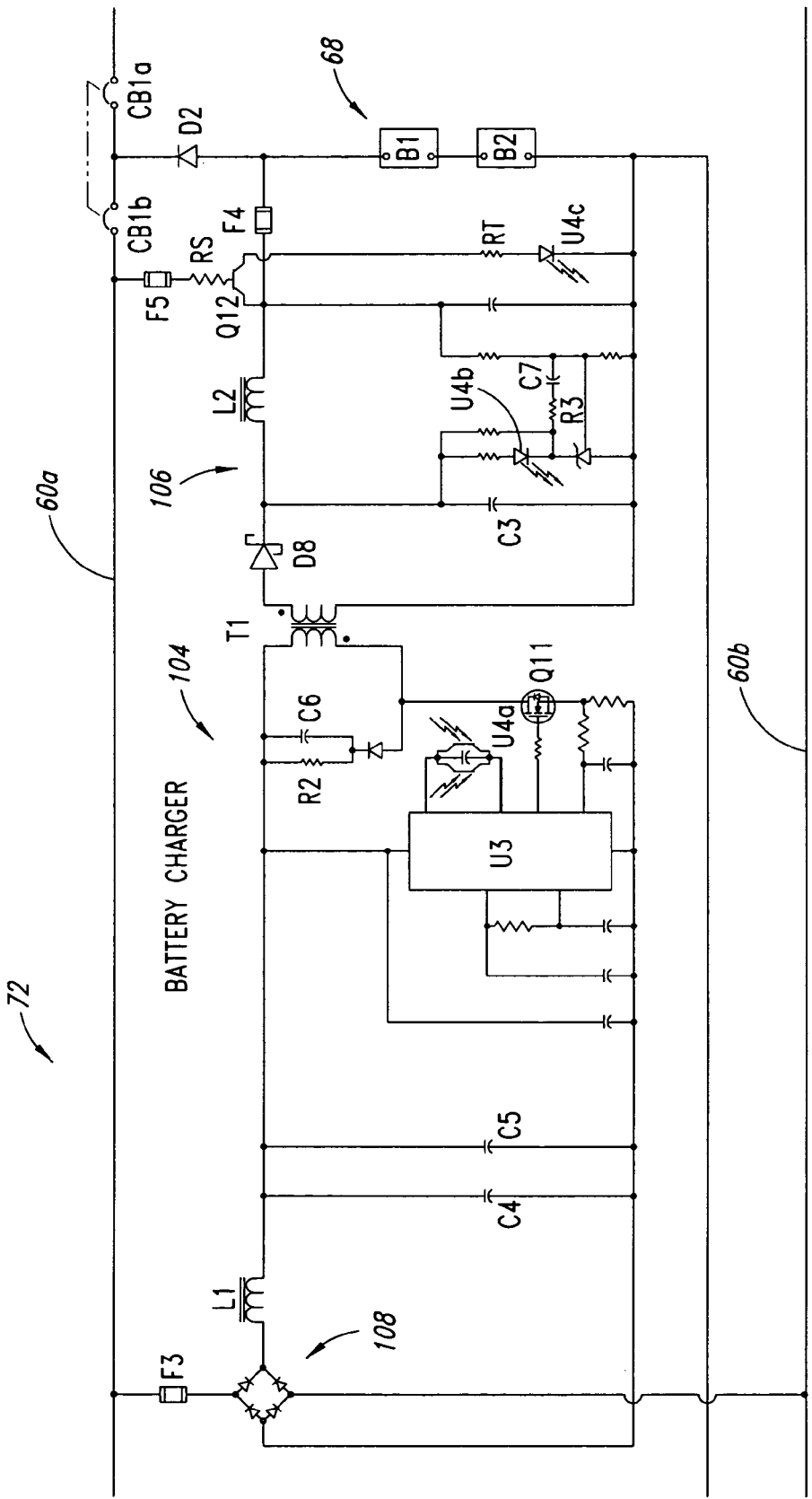
FIG. 5 is a schematic diagram of a charger circuit of the power system of FIG. 1, according to one illustrated embodiment.

FIG. 5 shows the charger circuit 72 according to one illustrated embodiment, employing a flyback DC-to-DC configuration, for performing battery charge current limmiting from the fuel cell sack 64, as well as, from the system power bus 30. The hybrid power module 16a may employ other charger circuits, the configuration of which may depend on the type of energy storage device 68 to be charged. For example, the charger circuit 72 illustrated in FIG. 5, may be suitable for certain lead acid battery type energy storage devices 72 which may be float charged. Other charger circuits 72 may be appropriate for different energy storage device types, for example, nickel cadmium, lithium ion, or nickel metal hydride which requires pulse float charging. Thus, the particular configuration of the charger circuit is dependent on the charging algorithm for the particular energy storage device 68 to be charged.

The charger circuit 72 illustrated in FIG. 5 comprises a transformer T1, switch Q11 and capacitor C3 in coupled in a flyback configuration. The transformer T1 inductively couples power from a primary side 104 of the charger circuit 72 to a secondary side 106. A controller U3 controls operation of the switch Q11 on the primaryy side 104 to successively store and release energy in the primary of the transformer T1.

The controller U3 receives feedback signals from the secondary side 106 via an optocoupler U4 comprising a receiver U4a, and a pair of transmitters such as light emitting diodes (LEDs) U4b, U4c, or similar device which permits the electrical isolation to be maintained between the primary and secondary sides 104, 106 of the charger circuit 72. Operation of the charger circuit 72 is inhibited when the parallel redundancy diode D2 becomes forward biased, to prevent the charger circuit 72 from supplying its own power. The optocoupler U4 may provide an indication of the forward biasing of the parallel redundancy diode D2 to the controller U3, which is detected via a transistor Q12, gate resistor RS, and terminal resistor RT.

The primary side 104 of the charger circuit 72 may also comprise an input filter inductor L1. The input filter inductor L1 reduces or eliminates ripple on the input. The input filter inductor L1, along with capacitors C4, C5 limits in-rush current. The primary side 104 may further comprises a snubber circuit formed by a resistor R2 and capacitor C6 coupled electrically in parallel across a primary of the transformer T1.

The secondary side 106 of the charger circuit 72 may comprise a output filter inductor L2, for reducing or eliminating ripple, potentially increasing the life of the energy storage device 68, for example, where the energy storage device takes the form of a battery. The secondary side 106 may further comprise a pulse eliminating filter formed by a resistor R3 and capacitor C7 to reduce or eliminate pulsing on the LED U4b of the optocoupler U4.

In some embodiments, the charger circuit 72 may optionally comprise a rectifier, such as a diode bridge rectifier 108 coupled to rectify current from the first and the second current paths 60a, 60b, respectively. Thus, the charger circuit 72 may receive external power from an AC source, for example, a 120VAC source.

Figure 6:
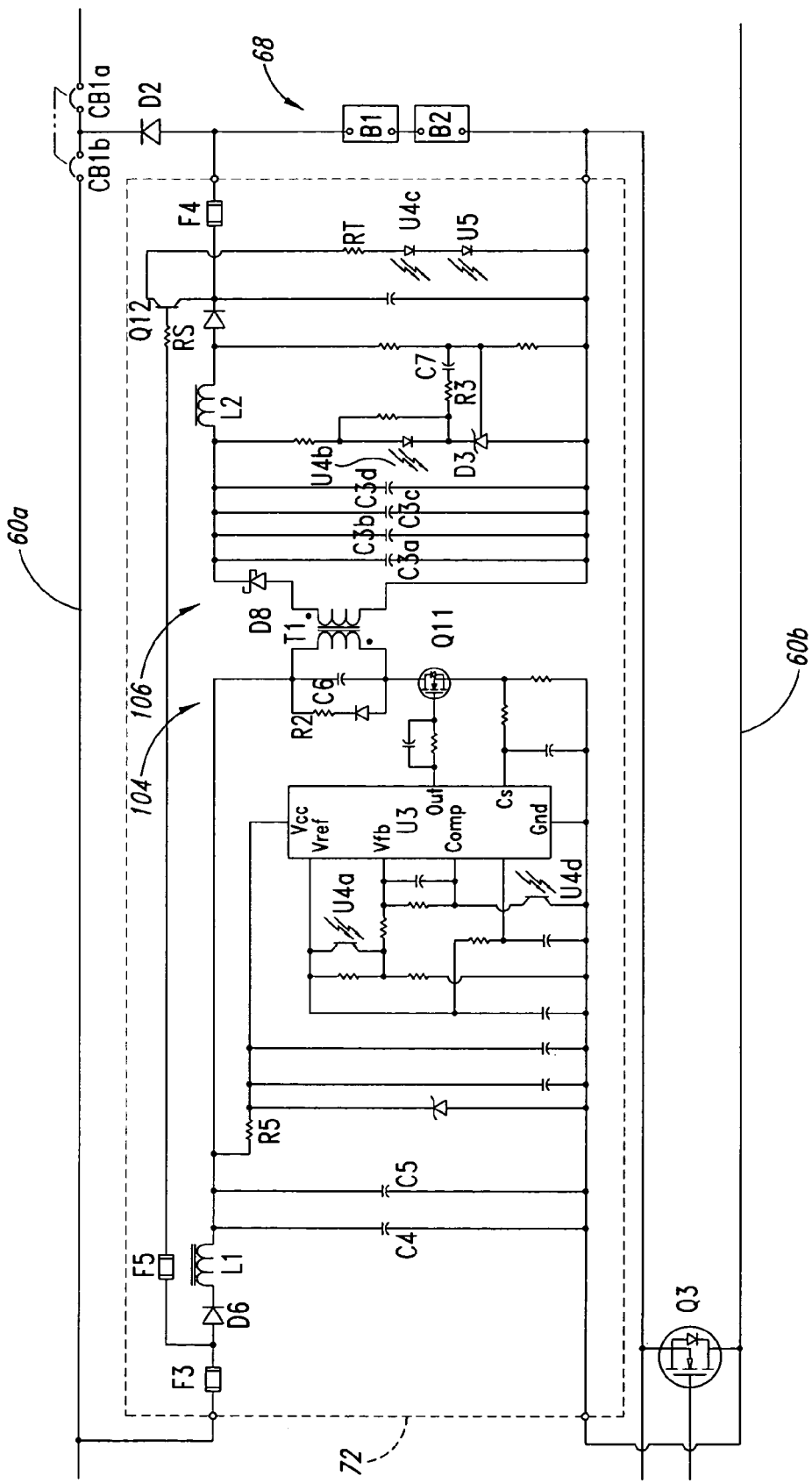
FIG. 6 is a schematic diagram of a charger circuit of the power system of FIG. 1, according to another illustrated embodiment.

FIG. 6 shows the charger circuit 72 according to another illustrated embodiment, employing a flyback DC-to-DC configuration, for performing battery charge current limiting from the fuel cell sack 64, as well as, from the system power bus 30. The embodiment of FIG. 6 is similar in some respects to the embodiment of FIG. 5, thus similar structures are identified by the same reference numbers to facilitate comparison. Only some of the more significant differences in structure and operation are described below. Other differences will be apparent from inspection of the schematic diagrams.

On the primary side 104, the charger circuit 72 of FIG. 6 omits the diode bridge rectifier 108. The primary side 104 adds a second receiver U4d to the optocoupler U4, such that the controller U3 receives separate indications from the LED U4b via the receiver U4a and from the LED U4c via the receiver U4d.

On the side secondary side 106, the charger circuit 72 employs four capacitors C3a-C3d electrically coupled in parallel, rather than the single capacitor C3 shown in the embodiment of FIG. 5, allowing the use of capacitors of smaller capacitance. An LED U5 is added electrically coupled in series with the LED U4c, to provide a visual indication when the energy storage device 68 is discharging. Otherwise the secondary side is unchanged, including the non-referenced elements.

Figure 7:
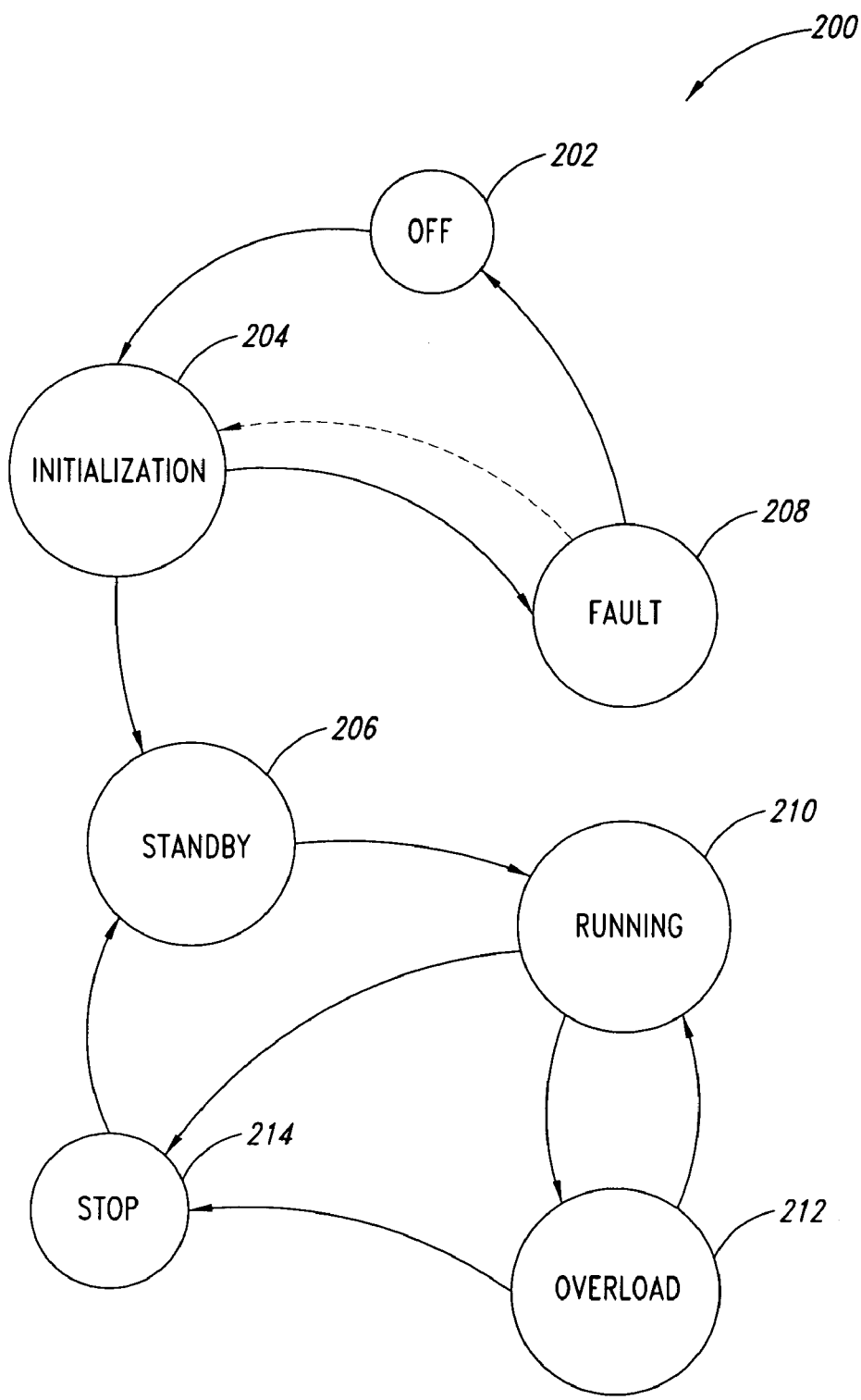
FIG. 7 is a state diagram illustrating a state machine implemented by the controller of the hybrid power module according to one illustrated embodiment.

FIG. 7 shows a state diagram 200 of operation of the hybrid power module 16a of FIG. 3, according to one illustrated embodiment. Other embodiments may include additional, fewer and/or different states, as well as, additional, fewer and/or different transitions. Other aspects of the general operation of hybrid power module 16a are discussed in commonly assigned U.S. patent application Ser. No. 09/916,240, entitled "Fuel Cell System Method, Apparatus and Scheduling"; and Ser. No. 10/817,052, entitled "Fuel Cell System Method, Apparatus and Scheduling."

Initially, the hybrid power module 16a is in an OFF state 202. The circuit breakers CB1a, CB2b, and associated switch S are in OPEN or OFF states. The hybrid power module 16a, including the fuel cell stack 64 and energy storage device 68, is electrically disconnected from the system power bus 30, neither supplying or absorbing power from the system power bus 30. The controller U1 and the balance of plant 80 are all in OFF states. No current is drawn by the balance of plant 80 from the energy storage device 68.

In response to the closure of the circuit breakers CB1a, CB2b, and the associated switch S, the hybrid power module 16a enters an initialization state 204. The closure-couples power to the controller U1, which performs an initialization procedure, for example, executing a self test or check, such as that discussed in commonly assigned U.S. patent application Ser. No. 09/916,117, entitled "Fuel Cell Controller Self-inspection"; Ser. No. 10/817,052, entitled "Fuel Cell System Method, Apparatus and Scheduling"; and Ser. No. 09/916,240, entitled "Fuel Cell System Method, Apparatus and Scheduling." If the outcome of the self test or check is positive, and if the voltage across the energy storage device 68 is sufficient (e.g. 22V), the controller U1 turns ON or closes the switch Q3, electrically coupling the hybrid power module 16a to the system power bus 30. The hybrid power module 16a then enters a standby state 206. The energy storage device 68 charges from power supplied via the system power bus 30. If a fault is detected, the hybrid power module 16a enters a fault state 208.

In the standby state 206, the hybrid power module 16a awaits a start or run command. A backup hybrid power module 16a will spend a substantial portion of its life in the standby state. The energy storage device 68 is charged, and the charge is maintained from the system power bus 30 via the charger circuit 72. A communications port (e.g., RS-232 port) is active, so the hybrid power module 16a may be accessed either locally or remotely. The controller U1 may enter a sleep mode to conserve power. From time-to-time, the controller U1 may wake from the sleep mode, and perform self tests, test of associated memory, and check watch dogs, as discussed in commonly assigned U.S. patent application Ser. No. 09/916,117, entitled "Fuel Cell Controller Self-Inspection"; Ser. No. 10/817,052, entitled "Fuel Cell System Method, Apparatus and Scheduling"; and Ser. No. 09/916,240, entitled "Fuel Cell System Method, Apparatus and Scheduling." The controller U1 of the hybrid power module 16a may employ a five try reinitialize timer. Upon receipt of a start or run command, the hybrid power module 16a enters a start state 210.

In the start state 210, the controller U1 turns ON the switch Q4 of the pre-charge circuit 96 to pre-charge the output device bus of the balance of plant 80. When the voltage of the bus rises to near the battery voltage, the controller U1 turns ON the switch Q5 to bypass the pre-charge circuit 96, leaving the switch Q4 in the ON state. The fan 85 of the cooling subsystem 86 and air pump 83 of the pump subsystem 82 are set to their startup speed. The air flow meter is checked fro a reasonable reading. The hybrid power module 16a then enters a run state 211.

In the run state 211, the fuel cell stack 64 is operating and producing power, and the hybrid power module 16a providing between 0-100% of its full rated power. In the run state 211, the stack disconnect switch Q3 is in the ON or CLOSED state, to provide power to the system power bus 30. All power is provided from the fuel cell stack 64, with no power being drawn from the energy storage device 68. The linear regulator 75 is operating in stack current limit mode or stack voltage limit mode as discussed in more detail in commonly assigned U.S. patent application Ser. No. 10/017,470, entitled "Method and Apparatus for Controlling Voltage From a Fuel Cell System"; Ser. No. 10/017,462, entitled "Method and Apparatus for Multiple Mode Control of Voltage From a Fuel Cell System"; and Ser. No. 10/017,461, entitled "Fuel Cell System Multiple Stage Voltage Control Method and Apparatus."

From time-to-time, the hybrid power module 16a may enter an overload state 212, where the fuel cell stack 64 is operating and power is drawn from both the fuel cell stack 64 and the energy storage device 68. In the overload state 212, the stack disconnect switch Q3 is in the ON or CLOSED state, to provide power to the system power bus 30. The liner regulator 75 is operating in stack current limit mode or stack voltage limit mode in the overload state 212.

In response to receiving a stop or not run command, the hybrid power module 16a enters a stop state 214. This typically may occur when grid power returns to supply the load which is being backed up by the power supply system 10 and/or hybrid power module 16a. In the stop state, the linear regulator 75 disconnects the load from the fuel cell stack 64. The fuel cell stack 64 is purged of fuel and water as discussed in the commonly assigned patents and patent application, relying on power from the energy storage device 68. After purging, the hybrid power module 16a then enters the standby state 206.

In the fault state 208, the stack disconnect switch Q3 is in the OFF or OPEN state, to disconnect the fuel cell stack 64 from the system power bus 30. The return transition may be to either the off state 202 (illustrated by solid arrow), or optionally to the initialization state 204 (illustrated by broken arrow). Which transition occurs may be predefined, or may be determined at the time of the fault based on the severity of the fault condition.

Figure 8:
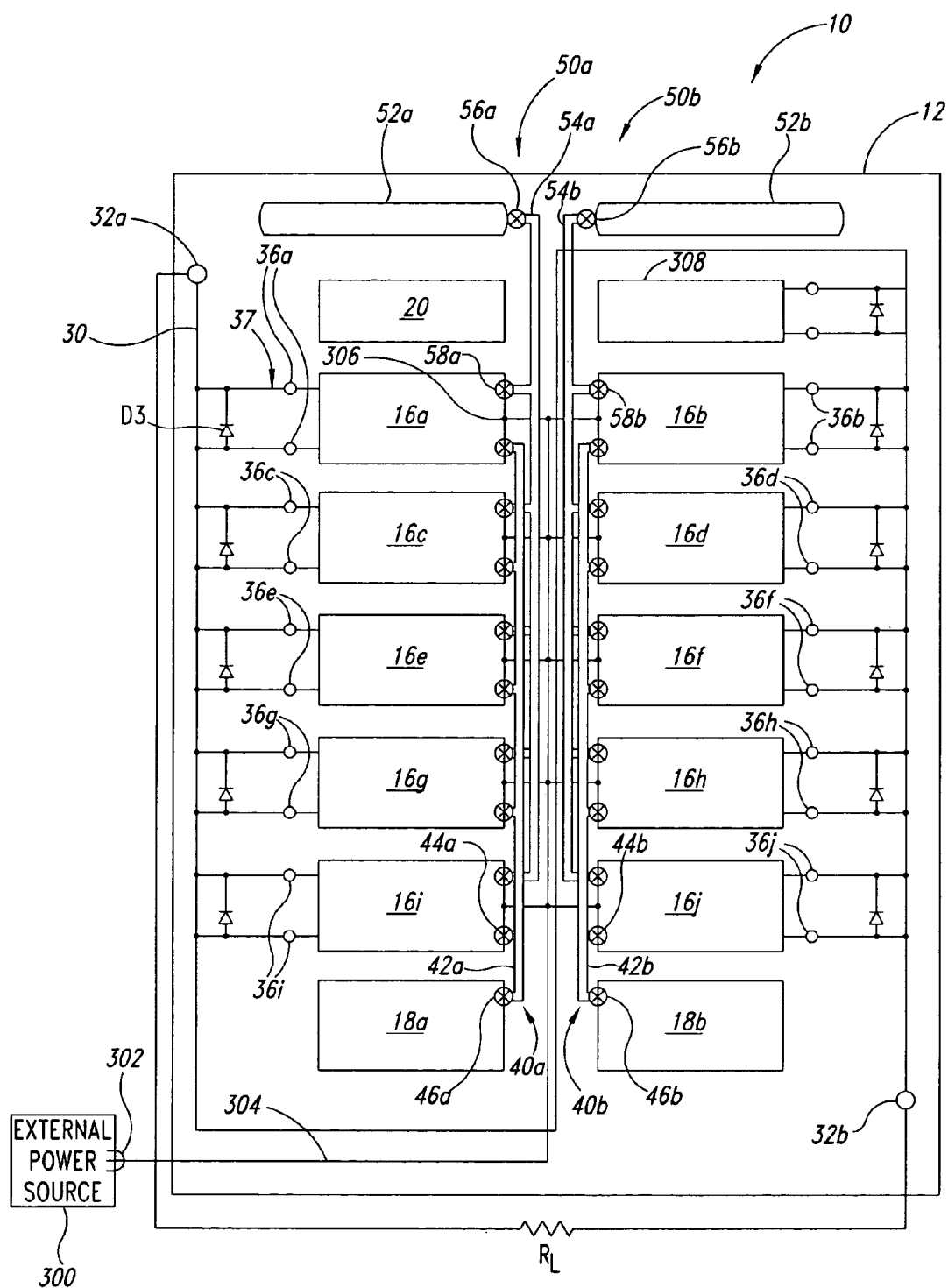
FIG. 8 is a schematic diagram of the power system of FIG. 1, according to another illustrated embodiment, employing an external power source to supply power to the hybrid modules at certain times, and including an external power storage device such as an existing array of batteries or ultracapacitors.

FIG. 8 shows an internal configuration of the power system 10 according to another illustrated embodiment, where the power modules 16a-16j may be coupled to receive electrical power from an external power source 300, for example, a three phase AC external power source such as a conventional power grid, via an external source connector 302, external source bus 304, and selectively releasable external source bus connectors 306 (only one called out in FIG. 8). The embodiment of FIG. 8 is not restricted to conventional power grids, but rather may receive AC and/or DC electrical power from any external power source, that is, a power source that is separate and distinct from the power module. Where an external power source 300 is readily available, this permits the power modules 16a-16j to maintain the charge on the energy storage device 68 with minimal operation of the fuel cell stack 64, resulting in more efficient operation. The embodiment of FIG. 8, also omits the Zener diode D4 and resistor R1 (FIGS. 2 and 3) that were electrically coupled across the pairs of selectively releasable connectors 36a-36j, significantly improving overall operating efficiency.

As illustrated in FIG. 8, the power system 10 may comprise one or more external energy storage devices 308. The external energy storage device 308 may, for example, take the form of existing batteries and/or ultra-capacitor banks, that are present at the installation site, and separate and distinct from the hybrid power modules 16. For example, many existing telecommunications sites employ backup equipment including lead acid batteries to provide power during power outages. Another illustrated embodiment of the hybrid power modules 16 discussed in detail below with respect FIGS. 9-12, allows the charging voltage to be independent of the output voltage, thus allowing the power system 10 to take advantage of existing external energy storage devices 308. While illustrated as installed in the housing 12, the external energy storage device 308 may be located outside of, or remote with respect to the housing 12 of the power system 10. Maintaining an independence between the charging voltage for the energy storage device 68 and the output voltage of the hybrid power module 16a may also be used to accommodate differences in temperature between energy storage devices such as the energy storage device 68 of the hybrid power module and an external energy storage device 308.

Figure 9:
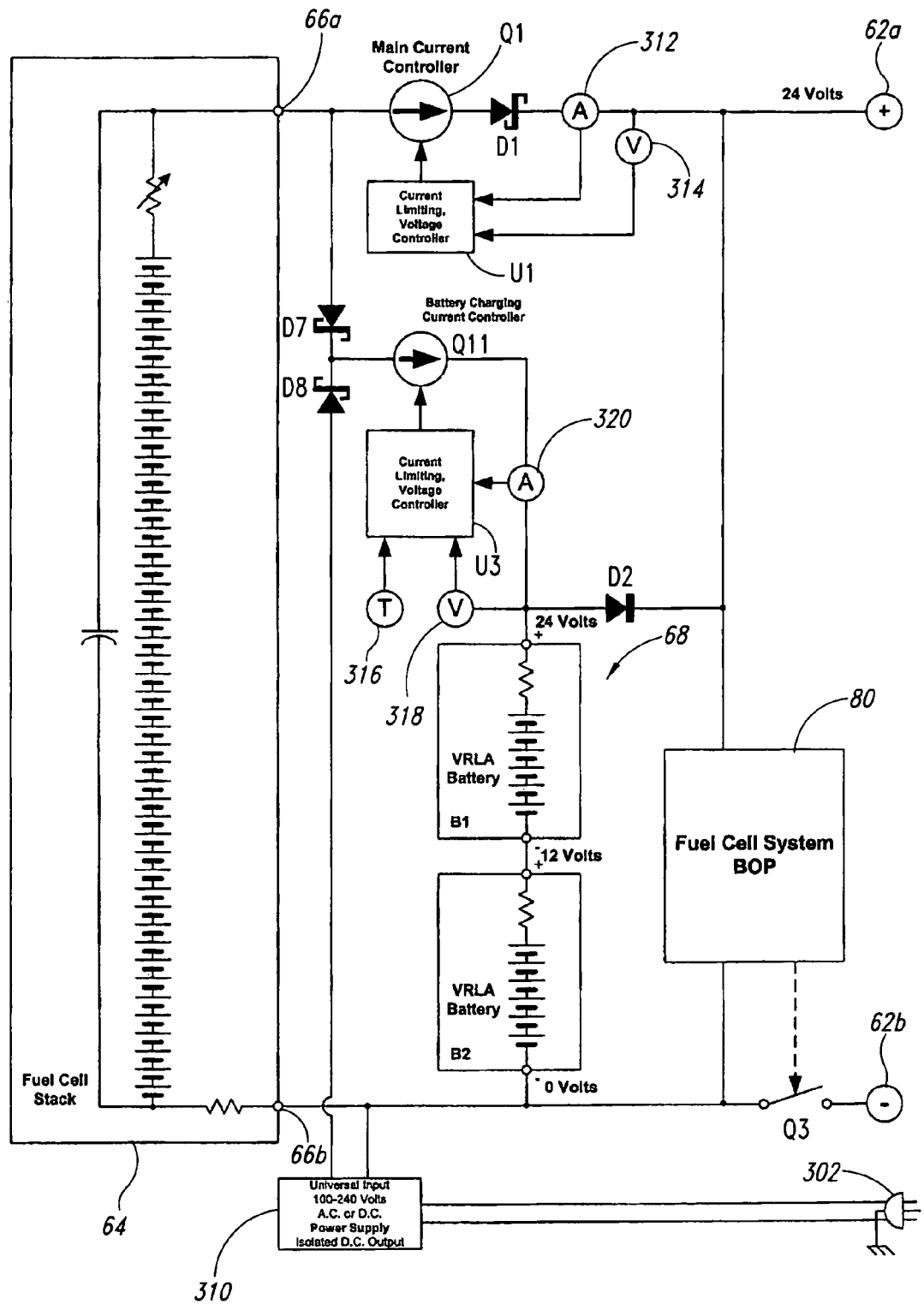
FIG. 9 is a high level schematic diagram of one of the hybrid power modules of FIG. 8, according to one illustrated embodiment.

FIG. 9 shows a hybrid power module 16a, according to another illustrated embodiment, particularly suited for receiving electrical power from the external power source 300. Some structures are similar to those of the embodiment of FIGS. 3-6, and are thus identified by the same reference numbers to facilitate comparison. Only some of the more significant differences in structure and operation are described below. Other differences will be apparent from inspection of the Figures.

The hybrid power module 16a of FIG. 9 includes the external source connector 302 for connecting the external power source 300 (FIG. 8), and power supply 310 operable to convert power from the external power source to a form suitable for use by the charger circuit 72. For example, the power supply 310 may include an active and/or passive rectifier to convert alternating current to a direct current suitable for the charger circuit 72. Thus, the power supply 310 could convert power from an AC external energy source 300 such as a three phase source liked a conventional power grid, micro-turbine or generator. The power supply 310 may also convert the voltage of the power from the external energy source 300, for example, stepping the voltage up or down to a range or nominal value suitable for the charge circuit 72. The power supply 310 may take the form of a "universal" power supply, capable of handling a variety of inputs, such as universal power supplies available from Condor D.C. Power Supplies, Inc of Oxnard, Canada. While illustrated as part of the hybrid power module 16a, in some embodiments the power supply 310 may be provided separately from the hybrid power module 16a, and/or shared by multiple power modules 16 in the power system 10. A pair of Zener diodes D7, D8 isolate the power supply 310 from the first current path 60a.

Additionally, FIG. 9 illustrates a number of sensors that were not expressly illustrated in the embodiment of FIGS. 3-6, but which would typically be included in the hybrid power modules 16 of FIGS. 3-6. In particular, one or more current sensors 312 and a voltage sensors 314 may measure the current flow from, and potential of the fuel cell stack 64, respectively, The current and/or voltage sensors 312, 314 may, for example, measure current and/or potential on the first current path 60a. The current and/or voltage sensors 312, 314 supply the current and/or potential measurements to the controller U1 for use in controlling operation of the hybrid power module 16a.

One or more temperature sensors 316, voltage sensors 318, and/or current sensors 320 may measure the temperature of, voltage across, and/or current level of the energy storage device 68, and provide these measurements to the controller U3 of the charger circuit 72 for use in controlling charging of the energy storage device 68. A knowledge of the temperature, voltage and/or current permits the controller U3 to employ highly efficient charging algorithms.

Figure 10:
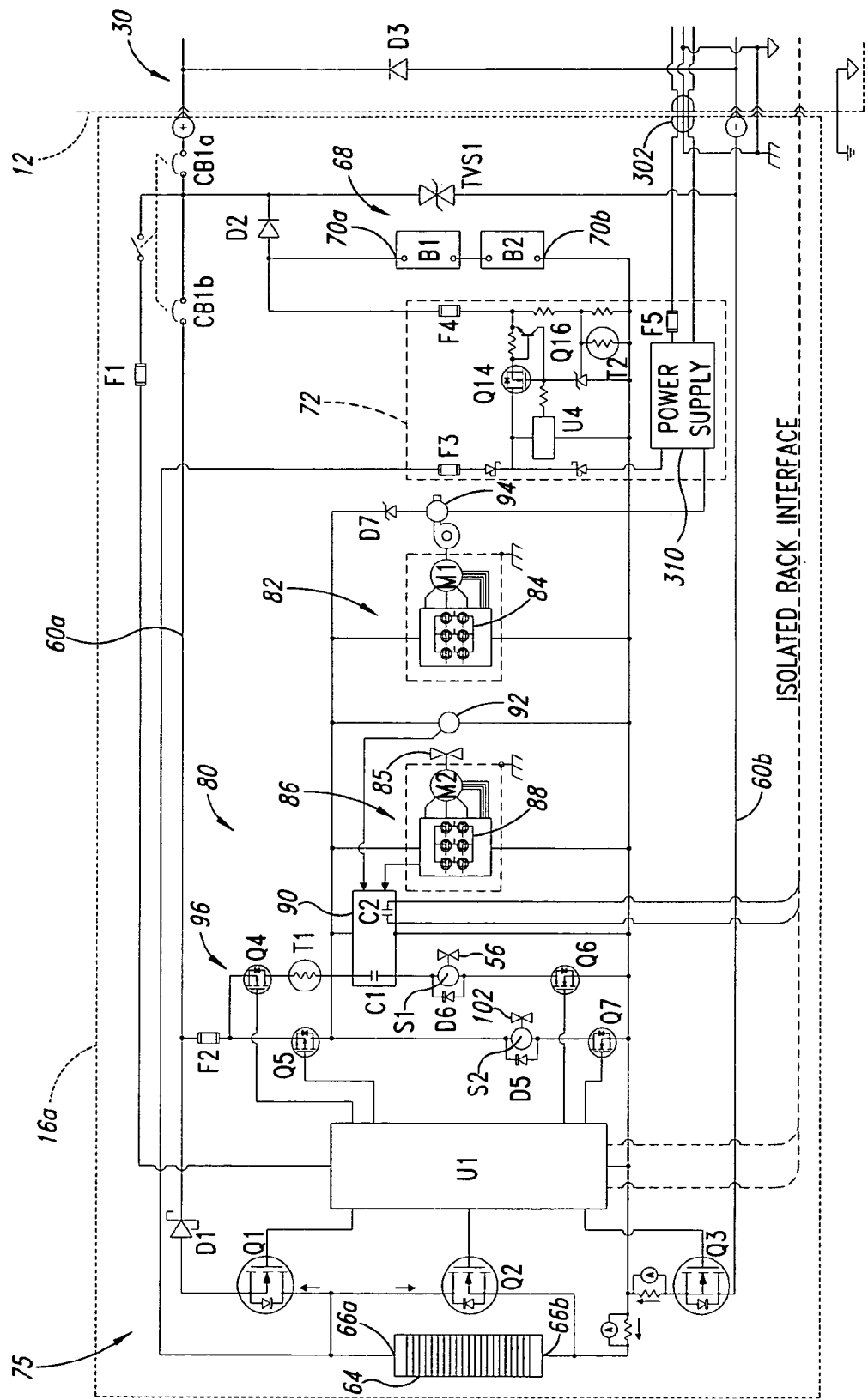
FIG. 10 is a low level schematic diagram of one of the hybrid power modules of FIG. 9, according to one illustrated embodiment, showing an simplified embodiment of the charger circuit.

FIG. 10 shows one of the power modules 16a, and a portion of the system power bus 30 according to the embodiment illustrated in FIG. 9. Many of the structures illustrated in FIG. 10 have already been discussed above, and thus will not be repeated in reference to FIG. 10. In addition to previously discussed structures, FIG. 10 shows an external power connector 322, that may be coupled to the external power connector 302 on the hybrid power module 16a to supply power thereto. The external power connector 302 may, for example, be physically associated with the housing 12 of the power system 10. FIG. 10 also shows a simplified embodiment of the charger circuit 72 comprising a charge pump U4, linear path Q14, current limiting transistor Q16, and a thermistor T2, which advantageously reduces the parts count and resulting cost of the charger circuit 72, although may not provide as efficient operation as other embodiments of the charger circuit 72.

Figure 11:
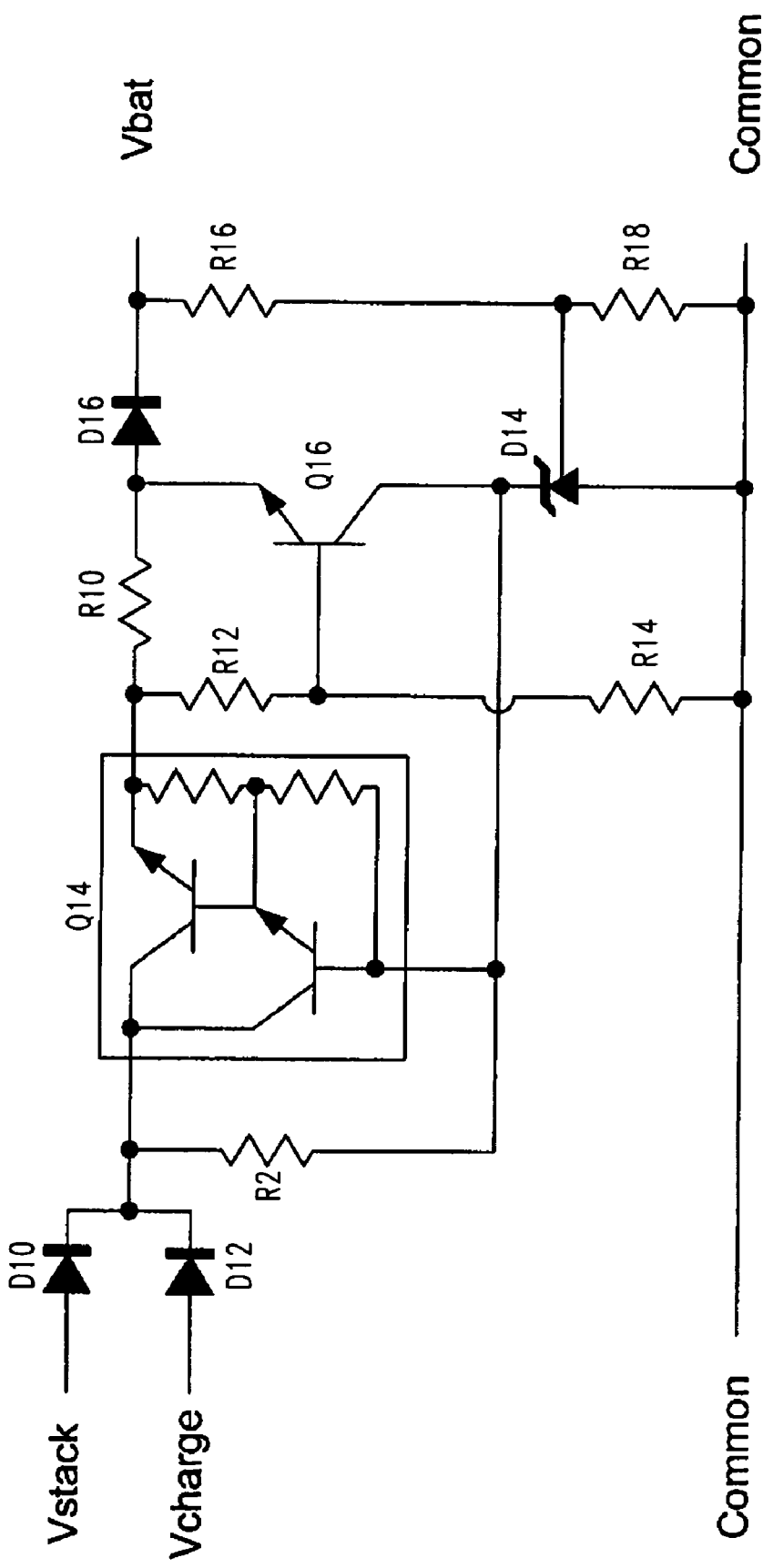
FIG. 11 is a high level schematic diagram of the charger circuit according to another illustrated embodiment, suitable for use with the hybrid power module of FIGS. 9 and 10.

FIG. 11 shows high level schematic of the charger circuit 72 according to yet another embodiment, particularly suited for use with an embodiment that employs an external power source, such as that illustrated in FIGS. 8-10.

A pair of diodes D10, D12 respectively receive values representing the voltage available from the fuel cell stack (Vstack) and the voltage (Vcharge) available via the external power source 300 and/or power supply 310 to charge the energy storage device 68 (FIGS. 9 and 10). The pair of diodes D10, D12 function as an analog OR gate to select the greater of the available voltages.

A linear path element Q14, functions as a current regulator, electrically coupled to the pair of diodes D10, D12 via a resistor R8. The liner path element Q 4 may, for example, be formed by a Darlington pair of transistors as illustrated in FIG. 11. A current limiting transistor Q16 is electrically coupled to control the linear path element Q14 based on the voltage across the energy storage device 68 (FIGS. 9 and 10).

Figure 12:
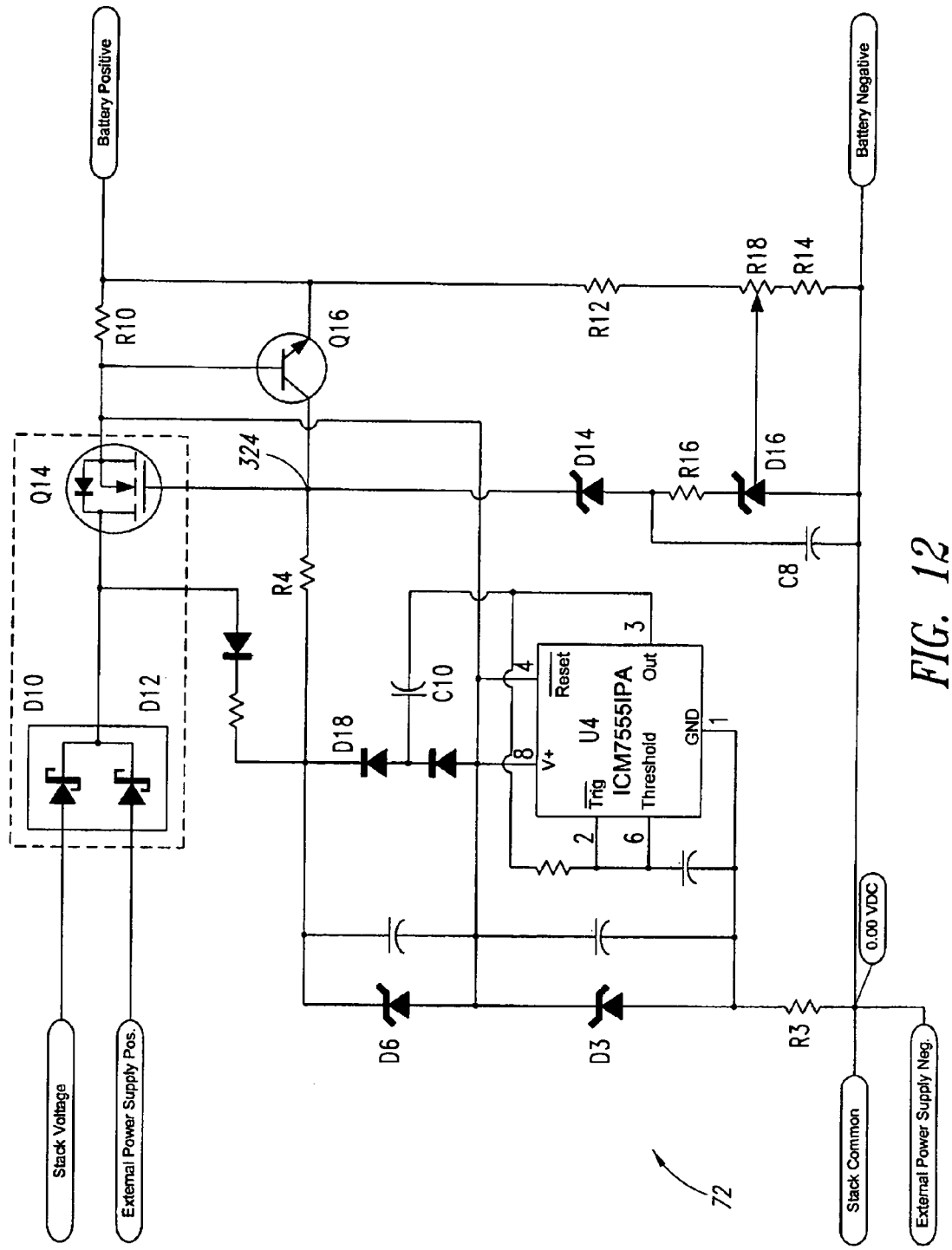
FIG. 12 is a low level schematic diagram of the charger circuit according similar in some respects to that of FIG. 11, suitable for use with the hybrid power module of FIGS. 9 and 10.

FIG. 12 shows a low level schematic of the charger circuit 72 of FIG. 11. Common reference numbers are used in FIGS. 11 and 12 to facilitate comparison between the Figures.

As discussed above, the charger circuit 72 comprises the diode pair D10, Dl2 and the liner path element Q14. The diode pair D10, D12 function as an analog OR gate, and may take the form of Schottky diodes for low forward conduction loss. The switching terminal (e.g., gate. base) of the linear path element Q14 is electrically coupled to a node 324, into which functionally distinct sub-circuits couple signals to realize various control regimes. In particular, the charger circuit 72 of the embodiment of FIG. 12 functions as a two mode controller, implementing a current control mode and a voltage control mode.

The charger circuit 72 implements the current control mode via a current limiting sub-circuit, comprising the current limiting transistor Q16 and current sensing resistor R10. The current limiting transistor Q16 is electrically coupled to the node 324, so as to pull down the gate of the linear path element Q14 when the voltage across resistor R10 exceeds some threshold (e.g., 0.6V) in order to limit current through the linear path element Q14 and hence the current output of the charger circuit 72. The current limiting sub-circuit may also comprise the voltage divider formed by resistors R12; R14, which senses the voltage across the energy storage device 68 (e.g., array of battery and/or super-capacitor cells), which causes the current limiting transistor Q16 to bleed energy from the gate of the liner path element Q14 if the voltage across the energy storage device 68 is too high.

The charger circuit 72 implements the voltage regulation mode via a voltage limiting sub-circuit, comprising a Zener diode D14 and resistor R16 electrically coupled between the node and the second pole 70b of the energy storage device 68. The voltage limiting sub-circuit may also comprise an adjustable diode D16 and pot R18, the pot R18 electrically coupled between the voltage divider formed by resistors R12, R14, which allows the setting of a voltage set point for the voltage limiting sub-circuit. The voltage limiting sub-circuit of the charger circuit 72 may also provide frequency compensation, for example, via the resistor RR16 and a capacitor C8, to prevent oscillation about the voltage set point.

The charger circuit 72 may also employ a charge pump U4 in order to increase efficiency, since it is highly desirable to operate very close to the value of the voltage across the fuel cell stack (i.e., Vstack) at full power. The output of the charge pump is coupled to the node 324 via a capacitor C11 and diode D18.

While not illustrated in FIG. 12, the charger circuit 72 may for compensate for the temperature changes of the energy storage device 68. For example, a thermistor T2 (FIG. 10) may be located on either side of the pot R18, depending on whether the thermistor has a positive or a negative temperature coefficient.

The charger circuit 72 also functions as a starting circuit, for example, allowing super-capacitors and/or batteries to pull up from a dead discharge.

The embodiment illustrated in FIGS. 8-12 may execute a state machine similar to that shown in FIG. 7, although in operation the charging circuit will typically rely on power supplied by the external power source 300, for example via the power supply 310, or in some embodiments may additionally or alternatively rely on power supplied by the system power bus (FIG. 2), and in even further embodiments on excess power produced by the fuel cells stack 64.

All of the above U.S. patents, U.S. patent application publications, U.S. patent applications, foreign patents, foreign patent applications and non-patent publications referred to in this specification and/or listed in the Application Data Sheet, including but not limited to commonly assigned U.S. patent application Ser. No. 09/916,241, entitled "Fuel Cell Ambient Environment Monitoring and Control Apparatus and Method"; Ser. No. 09/916,117, entitled "Fuel Cell Controller Self-Inspection"; Ser. No. 10/817,052, entitled "Fuel Cell System Method, Apparatus and Scheduling"; Ser. No. 09/916,115, entitled "Fuel Cell Anomaly Detection Method and Apparatus"; Ser. No. 09/916,211, entitled "Fuel Cell Purging Method and Apparatus"; Ser. No. 09/916,213, entitled "Fuel Cell Resuscitation Method and Apparatus"; Ser. No. 09/916,240, entitled "Fuel Cell System Method, Apparatus and Scheduling"; Ser. No. 09/916,239, entitled "Fuel Cell System Automatic Power Switching Method and Apparatus"; Ser. No. 09/916,118, entitled "Product Water Pump for Fuel Cell System"; Ser. No. 09/916,212, entitled "Fuel Cell System Having a Hydrogen Sensor"; Ser. No. 10/017,470, entitled "Method and Apparatus for Controlling Voltage from a Fuel Cell System"; Ser. No. 10/017,462, entitled "Method and Apparatus for Multiple Mode Control of Voltage from a Fuel Cell System"; Ser. No. 10/017,461, entitled "Fuel Cell System Multiple Stage Voltage Control Method and Apparatus"; Ser. No. 10/440,034, entitled "Adjustable Array of Fuel Cell Systems"; Ser. No. 10/430,903; entitled "Method and Apparatus for Improving the Performance of a Fuel Cell Electric Power System"; Ser. No. 10/440,025, entitled "Electric Power Plant With Adjustable Array of Fuel Cell Systems"; Ser. No. 10/440,512, entitled "Power Supplies and Ultracapacitor Based Battery Simulator"; and 60/569,218, entitled "Apparatus and Method for Hybrid Power Module Systems," are all incorporated herein by reference, in their entirety.

The above describes a power supply system 10 employing rechargeable energy storage devices 68 such as batteries, which provide starting and/or bridging power, and which can sink surging power. The charger circuit 72 can equalize charging of the energy storage device 68, whether charging is from the fuel cell system 64 or an external source such as the system power bus 30 or other external power source such as a power grid. Thus, the charger circuit 72 may eliminate the need for an external equalizer, and the need to customize the external equalizer to meet customer requirements. This may significantly simplify design, manufacturer and inventory requirements.

The charger circuit 72, as well as other aspects such as inclusion of the stack disconnect switch Q3, facilitate the series and/or parallel coupling of the hybrid power modules 16a-16j, making it easier to provide arrays of hybrid power modules 16a-16j, and thereby providing design flexibility. The designs also provide redundancy, allowing energy storage devices 68 and/or hybrid power modules 16a-16j to be quickly swapped in and out of the array as desired. The designs further allow parallel connection of unmatched capacity batteries (e.g., old and new batteries) while limiting current surges between the batteries, thereby providing a hot swappable product. The designs also allow the parallel coupling of hybrid power modules 16a-16j with different energy storage device types, for example, different battery chemistries or ages, and allow easy modification by replacement of the charger circuit 72 to accommodate different or new battery types employing more sophisticated charging algorithms. Further, the designs may accommodate the use of existing energy storage devices, such a batteries currently installed at customer facilities.

Further, the designs provide current in-rush limiting, allowing the battery simulators discussed in the some of the aforementioned commonly assigned patent applications to be greatly simplified, and thereby significantly reducing cost. The battery current limiting mode and/or battery voltage limiting mode discussed in the aforementioned commonly assigned patent applications may be moved from the linear regulator 75 to the charger circuit 72. This addresses any issues presented by the battery charging voltage at the battery's current limit being lower that the desired output voltage of the hybrid power module 16a-16j. Such as situation may, for example, occur just after the hybrid power module 16a-16j has started or surged. Previous hybrid power module 16a-16j designs may have accommodated such by lowering the output voltage to the required battery voltage. The above described hybrid power module 16a-16j snaps back to the desired voltage almost immediately. This operation also reduces the heat load on the heat sink (not shown) of the linear regulator 75.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A hybrid power module configured to modularly couple to and decouple from a power system housing having a system power bus for providing electrical power to at least two terminals electrically couplable to an external load, comprising:
   a module power bus comprising at least a first releasably couplable electrical bus terminal and a second releasably couplable electrical bus terminal, the first releasably couplable electrical bus terminal and the second releasably couplable electrical bus terminal being configured to releasably and electrically couple to and electrically decouple from a system power bus of a power system;
   a plurality of fuel cells electrically coupled to one another as a fuel cell stack, the fuel cell stack comprising a first pole electrically couplable to and electrically decouplable from the first releasably couplable electrical bus terminal and a second pole electrically coupled to the second releasably couplable electrical bus terminal, the fuel cell stack configured to selectively produce electrical power, and electrically couplable to provide the electrical power on the module power bus;
   an energy storage device comprising a first pole electrically couplable to and electrically decouplable from the first releasably couplable electrical bus terminal and a second pole electrically couplable to and electrically decouplable from the second releasably couplable electrical bus terminal, wherein the first releasably couplable electrical bus terminal, the first pole of the fuel cell stack and the first pole of the energy storage device have a common first electrical polarity, and the second releasably couplable electrical bus terminal, the second pole of the fuel cell stack and the second pole of the energy storage device have a common second electrical polarity that is opposite the common first electrical polarity, and the energy storage device configured to store electrical power and configured to release electrical power to the first releasably couplable electrical bus terminal and the second releasably couplable electrical bus terminal;
   a first linear regulator electrically coupled between the first pole of the fuel cell stack and the first releasably couplable electrical bus terminal of the module power bus, and configured to regulate a flow of current from the first pole of the fuel cell stack to the first releasably couplable electrical bus terminal;
   at least two input terminals releasably and electrically couplable to an external power connector that is distinct from the hybrid power module to receive power from an external power source that is distinct from the hybrid power module via the external power connector; and
   a charger circuit comprising a first pole and a second pole, the charger circuit electrically coupled across the energy storage device such that the respective first poles of the charger circuit and the energy storage device are electrically coupled and have the first electrical polarity and such that the respective second poles of the charger circuit and the energy storage device are electrically coupled and have the second electrical polarity, and the charger circuit configured to supply electrical power to the energy storage device at approximately a defined voltage and charging regime, the charger circuit comprising a second linear regulator electrically coupled between the first pole of the energy storage device and a node electrically located between the first pole of the fuel cell stack and at least one of the at least two input terminals, the second linear regulator configured to regulate a flow of a first current from the first pole of the fuel cell stack to the energy storage device when the second pole of the fuel cell stack is electrically coupled to the second releasably couplable electrical bus terminal and configured to regulate a flow of a second current from at least one of the at least two input terminals releasably and electrically couplable to the external power connector when the second pole of the fuel cell stack is electrically decoupled from the second releasably couplable electrical bus terminal.

2. The hybrid power module of claim 1, further comprising:
   a stack disconnect switch configured to selectively provide and remove an electrical path between the second releasably couplable electrical bus terminal of the module power bus and the second pole of the fuel cell stack in a first state and a second state, respectively.

3. The hybrid power module of claim 1, further comprising:
   a first controller communicatively coupled to control the first linear regulator based on a number of system operational parameters.

4. The hybrid power module of claim 3, further comprising:
   a second controller communicatively coupled to control the second linear regulator based on a number of energy storage device operational parameters.

5. The hybrid power module of claim 1 wherein the first linear regulator comprises a plurality of regulating transistors electrically coupled in parallel with one another between the first pole of the fuel cell stack and the first releasably couplable electrical bus terminal of the module power bus.

6. The hybrid power module of claim 1, further comprising:
   a stack protection diode electrically coupled between the first pole of the fuel cell stack and the first releasably couplable electrical bus terminal of the module power bus such that the stack protection diode substantially protects the fuel cell stack from currents received from the first releasably couplable electrical bus terminal and from the energy storage device.

7. The hybrid power module of claim 1, further comprising:
   a redundancy diode electrically coupled between the first pole of the energy storage device and the first releasably couplable electrical bus terminal of the module power bus to allow current to flow from the first pole of the energy storage device to the first releasably couplable electrical bus terminal when the redundancy diode is forward biased, and to prevent current from flowing from the first releasably couplable electrical bus terminal to the first pole of the energy storage device when the redundancy diode is reversed biased.

8. The hybrid power module of claim 1, further comprising:
   a first diode electrically coupled between the node and the first pole of the fuel cell stack to allow a current flow from the first pole of the fuel cell stack to the first linear regulator when the first diode is forward biased; and
   a second diode electrically coupled between the node and one of the at least two input terminals to allow a current flow from the one of the at least two input terminals to the first linear regulator when the second diode is forward biased.

9. The hybrid power module of claim 1 wherein the first and second releasably couplable electrical bus terminals are externally accessible from the hybrid power module to releasably and electrically couple to the system power bus.

10. The hybrid power module of claim 1, further comprising:
    a power converter electrically coupled to the node and electrically coupled to receive power from the at least two input terminals and to provide power converted therefrom to the energy storage device via the charger circuit.

11. The hybrid power module of claim 10 wherein the power converter comprises a rectifier.

12. The hybrid power module of claim 10 wherein the power converter comprises a universal power supply configured to convert both AC and DC power within a first voltage range to DC power of a defined nominal voltage.

13. The hybrid power module of claim 1 wherein the at least two input terminals comprise a first, a second, and a third input terminals, the first, the second and the third input terminals releasably and electrically couplable to a three phase alternating current power source via the external power connector.

14. The hybrid power module of claim 1 wherein the energy storage device comprises a plurality of battery cells electrically coupled to one another as a battery.

15. The hybrid power module of claim 1 wherein the first and the second releasably couplable electrical bus terminals are further electrically coupled in an array of hybrid power modules via the system power bus.

16. The hybrid power module of claim 1 wherein the first and the second bus releasably couplable electrical terminals are further releasably and electrically coupled to at least one external energy storage device that is external to, and distinct from, the hybrid power module.

17. The hybrid power module of claim 1, further comprising:
    at least one subsystem that comprises a portion of a balance of plant of the hybrid power module, the subsystem comprising at least one device electrically coupled across the module power bus to receive power from the module power bus.

18. The hybrid power module of claim 17, further comprising:
    a hybrid power module housing carrying the at least one subsystem and configured complimentary to a hybrid power module housing receiving position of a housing of the power system such that the hybrid power module housing is removably receivable therein.

19. The hybrid power module of claim 18 wherein the hybrid power module housing further carrying the energy storage device and the charger circuit, wherein the energy storage device and the charger circuit are electrically isolated from the system power bus when the first and the second releasably couplable electrical bus terminals are electrically isolated from the system power bus.

20. The hybrid power module of claim 18 wherein the at least one subsystem includes:
    a stack disconnect switch configured to selectively provide and remove an electrical path between the second releasably couplable electrical bus terminal of the module power bus and the second pole of the fuel cell stack in a first state and a second state, respectively;
    a controller communicatively coupled to control the first linear regulator and the stack disconnect switch based on a number of system operational parameters.

21. The hybrid power module of claim 20 wherein the stack disconnect electrically decouples each and every fuel cell in the hybrid power module from second releasably couplable electrical bus terminal of the module power bus when the stack disconnect electrically is in the second state.

22. A hybrid power module in an array of multiple hybrid power modules, each respective hybrid power module received by a respective hybrid power module position of multiple respective hybrid power module positions of a housing of a hybrid power system having a system power bus coupling the array of power modules to a first and a second terminal of the system power bus, the hybrid power module comprising:
    a module power bus comprising a first releasably couplable electrical bus terminal and a second releasably couplable electrical bus terminal, the first releasably couplable electrical bus terminal and the second releasably couplable electrical bus terminal being configured to releasably and electrically couple to the system power bus of the power system;
    a plurality of fuel cells electrically coupled to one another as a fuel cell stack, the fuel cell stack comprising a first pole electrically couplable to the first releasably couplable electrical bus terminal and a second pole electrically couplable to the second releasably couplable electrical bus terminal, the fuel cell stack selectively configured to produce electrical power, and electrically couplable to provide the electrical power on the module power bus;
    an energy storage device comprising a first pole electrically coupled to the first releasably couplable electrical bus terminal and a second pole electrically couplable to the second releasably couplable electrical bus terminal, and the energy storage device configured to store and configured to release electrical power to the first releasably couplable electrical bus terminal and the second releasably couplable electrical bus terminal, wherein the first pole of the fuel cell stack and the first pole of the energy storage device have a common first electrical polarity, and wherein the second pole of the fuel cell stack and the second pole of the energy storage device have a common second electrical polarity that is opposite the first electrical polarity;

a linear regulator electrically coupled between the first pole of the fuel cell stack and the first releasably couplable electrical bus terminal of the module power bus, and configured to regulate a flow of current from the first pole of the fuel cell stack to the first releasably couplable electrical bus terminal;

at least two input terminals releasably and electrically couplable to an external power connector that is distinct for the hybrid power module to receive power from an external power source that is distinct from the hybrid power module via the external power connector;

a charger circuit electrically coupled across the energy storage device and configured to supply electrical power to the energy storage device at approximately a defined voltage and charging regime, the charger circuit electrically coupled between the first pole of the energy storage device and a node electrically located between the first pole of the fuel cell stack and at least one of the at least two input terminals, the charger circuit configured to receive from the node input currents and configured to regulate a flow of an output current to the energy storage device, the input currents including a first current from the first pole of the fuel cell stack when the second pole of the fuel cell stack is electrically coupled to the second releasably couplable electrical bus terminal and a second current from at least one of the at least two input terminals releasably and electrically couplable to the external power connector when the second pole of the fuel cell stack is electrically decoupled from the second releasably couplable electrical bus terminal; and a module housing configured complimentary to a respective one of the multiple hybrid power module positions of the housing of the hybrid power system such that the module housing is releasably received therein, the module housing carrying at least the charger circuit and energy storage device and configured to provide access external from the module housing to the first and the second releasably couplable electrical terminals.

23. The hybrid power module of claim 22, further comprising:

at least one reactant supply coupler structure configured to removably couple to and decouple from a reactant supply system external to the hybrid power module, wherein the module housing is configured to provide external access to the at least one reactant supply coupler structure.

24. The hybrid power module of claim 23, further comprising:

at least one subsystem that comprises a portion of a balance of plant of the hybrid power module, the subsystem carried by the module housing and comprising at least one device electrically coupled across the module power bus to receive power from the module power bus.

25. The hybrid power module of claim 23, further comprising:

a controller electrically coupled to the module power bus and communicatively coupled to the at least one subsystem and carried by the module housing and configured to control the linear regulator, wherein the at least one subsystem and the controller are electrically isolated from the system power bus when the first and the second releasably couplable electrical bus terminals are electrically isolated from the system power bus.

26. The hybrid power module of claim 23 wherein the controller is configured to place the hybrid power module in a standby state, further comprising:

a communications port that is active when the hybrid power module is in the standby state, and the communications port is configured to provide a system controller of the hybrid power module system access to the hybrid power module when the hybrid power module is in the standby state.

27. The hybrid power module of claim 22, further comprising:

a stack disconnect switch configured to selectively provide and remove an electrical path between the second releasably couplable electrical bus terminal of the module power bus and the second pole of the fuel cell stack in a first state and a second state, respectively, wherein when the electrical path between the second releasably couplable electrical bus terminal of the module power bus and the second pole of the fuel cell stack is removed, each and every fuel cell of the hybrid power module is electrically decoupled from the second releasably couplable electrical bus terminal.

* * * * *